(12) United States Patent
Smith et al.

(10) Patent No.: US 11,968,456 B2
(45) Date of Patent: *Apr. 23, 2024

(54) TECHNIQUES FOR DETERMINING SETTINGS FOR A CONTENT CAPTURE DEVICE

(71) Applicant: Magic Leap, Inc., Plantation, FL (US)

(72) Inventors: Brian Keith Smith, Wellington, FL (US); Ilya Tsunaev, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,330

(22) Filed: Mar. 7, 2022

(65) Prior Publication Data

US 2022/0303446 A1    Sep. 22, 2022

Related U.S. Application Data

(60) Continuation of application No. 16/879,468, filed on May 20, 2020, now Pat. No. 11,303,818, which is a (Continued)

(51) Int. Cl.
*H04N 23/72* (2023.01)
*H04N 5/222* (2006.01)
(Continued)

(52) U.S. Cl.
CPC ........... *H04N 23/72* (2023.01); *H04N 5/2226* (2013.01); *H04N 5/265* (2013.01); *H04N 23/71* (2023.01);
(Continued)

(58) Field of Classification Search
CPC .. H04N 5/2352; H04N 5/2226; H04N 5/2351; H04N 5/2353; H04N 5/2355;
(Continued)

(56) References Cited

U.S. PATENT DOCUMENTS

| 5,033,029 A | 7/1991 | Jones |
| 5,333,029 A * | 7/1994 | Uchiyama ............. G02B 7/287 |
| | | 396/234 |

(Continued)

FOREIGN PATENT DOCUMENTS

| JP | 06326919 A | 11/1994 | |
| JP | H06326919 A * | 11/1994 | ............. H04N 5/238 |

(Continued)

OTHER PUBLICATIONS

U.S. Appl. No. 15/841,043, Final Office Action, dated Dec. 11, 2019, 11 pages.

(Continued)

*Primary Examiner* — Nhan T Tran
(74) *Attorney, Agent, or Firm* — KILPATRICK TOWNSEND & STOCKTON LLP

(57) ABSTRACT

A method for computing a total weight array includes receiving an image frame captured by a content capture device and identifying a plurality of objects in the image frame. Each object of the plurality of objects corresponds to one of a plurality of pixel groups. The method also includes providing a plurality of neural networks and calculating, for each object of the plurality of objects, an object weight using a corresponding neural network of the plurality of neural networks. The method further includes computing the total weight array by summing the object weight for each of the plurality of objects.

20 Claims, 21 Drawing Sheets

Related U.S. Application Data division of application No. 15/841,043, filed on Dec. 13, 2017, now Pat. No. 10,701,276.

(60) Provisional application No. 62/438,926, filed on Dec. 23, 2016.

(51) Int. Cl.
| | |
|---|---|
| H04N 5/265 | (2006.01) |
| H04N 23/63 | (2023.01) |
| H04N 23/71 | (2023.01) |
| H04N 23/73 | (2023.01) |
| H04N 23/741 | (2023.01) |
| H04N 23/743 | (2023.01) |
| H04N 23/76 | (2023.01) |

(52) U.S. Cl.
CPC ........... *H04N 23/73* (2023.01); *H04N 23/741* (2023.01); *H04N 23/743* (2023.01); *H04N 23/76* (2023.01); *H04N 23/63* (2023.01)

(58) Field of Classification Search
CPC ...... H04N 5/2356; H04N 5/243; H04N 5/265; H04N 5/23293
See application file for complete search history.

(56) References Cited

U.S. PATENT DOCUMENTS

| | | | |
|---|---|---|---|
| 7,903,141 | B1 | 3/2011 | Mariano et al. |
| 8,237,853 | B2* | 8/2012 | Takahashi .......... H04N 5/23219 |
| | | | 348/333.04 |
| 9,137,450 | B2* | 9/2015 | Osawa ................. H04N 5/2351 |
| 10,701,276 | B2 | 6/2020 | Smith et al. |
| 11,303,818 | B2* | 4/2022 | Smith ................. H04N 5/2356 |
| 11,503,204 | B2 | 11/2022 | Huang et al. |
| 2007/0052840 | A1* | 3/2007 | Okuno ................... H04N 23/71 |
| | | | 348/364 |
| 2009/0003678 | A1* | 1/2009 | Cutler ................... H04N 7/142 |
| | | | 382/132 |
| 2010/0296698 | A1* | 11/2010 | Lien .......................... G06T 7/20 |
| | | | 382/103 |
| 2011/0268369 | A1 | 11/2011 | Richards et al. |
| 2011/0293259 | A1* | 12/2011 | Doepke ............... H04N 5/2351 |
| | | | 348/E5.034 |
| 2013/0057654 | A1 | 3/2013 | Rafii et al. |
| 2013/0128075 | A1 | 5/2013 | Lukac |
| 2014/0307117 | A1* | 10/2014 | Feng .................... H04N 5/2351 |
| | | | 348/218.1 |
| 2014/0341467 | A1 | 11/2014 | Seo |
| 2015/0264241 | A1 | 9/2015 | Kleekajai et al. |
| 2016/0277724 | A1 | 9/2016 | Linaker |
| 2017/0061237 | A1* | 3/2017 | Kobayashi ........... G06K 9/6267 |
| 2017/0078551 | A1 | 3/2017 | Kweon et al. |
| 2017/0374254 | A1* | 12/2017 | Miyazaki ............ H04N 5/23254 |
| 2018/0183986 | A1 | 6/2018 | Smith et al. |
| 2020/0351427 | A1 | 11/2020 | Smith et al. |
| 2021/0195092 | A1 | 6/2021 | Huang et al. |

FOREIGN PATENT DOCUMENTS

| | | |
|---|---|---|
| JP | 1023324 A | 1/1998 |
| JP | 2006108759 A | 4/2006 |
| JP | 2007072013 A | 3/2007 |
| JP | 2007074163 A | 3/2007 |
| JP | 2007116236 A | 5/2007 |
| JP | 4149413 B2 | 9/2008 |
| JP | 4163537 B2 | 10/2008 |
| JP | 2008283456 A | 11/2008 |
| JP | 5005925 B2 | 8/2012 |
| JP | 2014155001 A | 8/2014 |
| JP | 2015032966 A | 2/2015 |
| JP | 6326919 B2 | 5/2018 |
| KR | 20080070733 A | 7/2008 |
| KR | 20090019657 A | 2/2009 |
| KR | 101679279 B1 | 11/2016 |
| KR | 20160130769 A | 11/2016 |

OTHER PUBLICATIONS

U.S. Appl. No. 15/841,043, Non-Final Office Action, dated May 30, 2019, 10 pages.
U.S. Appl. No. 15/841,043, Notice of Allowance, dated Feb. 20, 2020, 8 pages.
U.S. Appl. No. 15/841,043, "Restriction Requirement", dated Jan. 7, 2019, 6 pages.
U.S. Appl. No. 16/879,468, Non-Final Office Action, dated Jul. 9, 2021, 14 pages.
U.S. Appl. No. 16/879,468, Notice of Allowance, dated Dec. 8, 2021, 8 pages.
AU2017382721, "First Examination Report", dated Oct. 5, 2021, 5 pages.
Application No. EP17883301.8, Extended European Search Report, dated Feb. 12, 2020, 15 pages.
Application No. EP17883301.8, "Partial Supplementary European Search Report", dated Nov. 11, 2019, 20 pages.
Application No. IL267412, Office Action, dated Jul. 11, 2021, 11 pages.
Application No. IN201947022049, "First Examination Report", dated Dec. 17, 2021, 9 pages.
Application No. JP2019-533404, Office Action and English Translation, dated Dec. 3, 2021, 14 pages.
Application No. JP2019-533404, Office Action and English Translation, dated Apr. 5, 2022, 9 pages.
Application No. PCT/US2017/066195, International Preliminary Report on Patentability, dated Jul. 4, 2019, 7 pages.
Application No. PCT/US2017/066195 , "PCT Search Report", dated Mar. 7, 2018, 8 pages.
Zhang et al., "Active Exposure Control for Robust Visual Odometry in HDR Environments", retrieved from internet https://youtuve/TKJ8vknIXbM on Oct. 21, 2019, 2019, 9 pages.
Application No. AU2017382721, "Second Examination Report", dated Apr. 22, 2022, 2 pages.
Application No. CN201780080066.8 , English translation of Office Action, dated Nov. 25, 2022, 8 pages.
Application No. IN202248039334 , "First Examination Report", dated Jan. 12, 2023, 7 pages.
Application No. EP22177425.0, "Extended European Search Report", dated Nov. 18, 2022, 9 pages.
Application No. AU2017382721, "Notice of Acceptance", dated Sep. 16, 2022, 3 pages.
Application No. EP22177425.0, "Partial Supplementary European Search Report", dated Aug. 18, 2022, 11 pages.
IL296495 , "Office Action", dated Feb. 16, 2023, 4 pages.
JP2019-533404 , "Notice of Decision to Grant", dated May 9, 2023, 2 pages.
KR10-2019-7021337 , "Office Action", dated Mar. 14, 2023, 12 pages.
Japanese Patent Application No. 2022-125428, "Office Action", dated Jun. 2, 2023, 1 page. [no translation available].
Korean Patent Application No. 10-2019-7021337, "Office Action" and English translation, dated Aug. 21, 2023, 10 pages.
EP22177425.0, "Office Action", Feb. 1, 2024, 5 pages.
JP2022-125428, "Office Action" and English translation, Dec. 4, 2023, 6 pages.
KR10-2019-7021337, "Notice of Decision to Grant" and English translation, Jan. 22, 2024, 3 pages.

* cited by examiner

TECHNIQUES FOR DETERMINING SETTINGS FOR A CONTENT CAPTURE DEVICE

CROSS-REFERENCES TO RELATED APPLICATIONS

This application is a continuation of U.S. patent application Ser. No. 16/879,468, filed May 20, 2020, now U.S. Pat. No. 11,303,818, issued Apr. 12, 2022, entitled "TECHNIQUES FOR DETERMINING SETTINGS FOR A CONTENT CAPTURE DEVICE," which is a divisional of U.S. patent application Ser. No. 15/841,043, filed Dec. 13, 2017, U.S. Pat. No. 10,701,276, issued Jun. 30, 2020, entitled "TECHNIQUES FOR DETERMINING SETTINGS FOR A CONTENT CAPTURE DEVICE," which is a non-provisional of and claims the benefit of and priority to U.S. Provisional Patent Application No. 62/438,926, filed Dec. 23, 2016, entitled "METHOD AND SYSTEM FOR DETERMINING EXPOSURE LEVELS," the disclosures of which are hereby incorporated by reference in their entirety for all purposes.

BACKGROUND

This disclosure generally relates to determining settings (such as an exposure setting) for a content capture device. The exposure setting may relate to an amount of light a sensor of a content capture device receives when content (e.g., an image or a video) is captured. Examples of exposure settings include a shutter speed, an aperture setting, or an International Standards Organization (ISO) speed.

Traditional solutions for setting exposure were handled by a user. For example, a user would adjust exposure settings to their liking. However, this proved to be unreliable, and often produced suboptimal results.

Today, automatic exposure control (AEC) is a standard feature on cameras. AEC automatically determines exposure settings for an image without user input. Using AEC, a camera may determine an exposure setting for the camera. However, AEC typically measures an amount of light in a field of view, with no reference to what is in the field of view. Therefore, there is a need in the art for improved AEC.

SUMMARY

Provided are techniques for determining one or more settings (e.g., an exposure setting and/or a gain setting) for a content capture device. In some examples, to determine the one or more settings, luma values of pixels of an image from the content capture device may be identified. Objects in the image and information associated with the objects may also be identified. The information associated with the objects may be divided into categories. And, using the objects and the information, a separate weight array for each category of the information may be computed. The separate weight arrays may be combined to create a total weight array to augment the luma values. The augmented luma values may be aggregated to compute a weighted luma average for the image. Based upon a difference of the weighted luma average and a target, the one or more settings may be adjusted.

In other examples, rather than computing a separate weight array for each category of the information, the information associated with each object may be used in a separate learning based model. Combining the output of each learning based model, a total weight array may be created to augment the luma values of an image. The augmented luma values may be aggregated to compute a weighted luma average for the image. Based upon a difference of the weighted luma average and a target, the one or more settings may be adjusted.

In other examples, a weighting model, as described herein, may be used for an object in an image of a scene. The same weighting model may then be used for other objects in other images of the scene such that an image stitcher may combine the image and the other images together to create an optimized image.

Numerous benefits are achieved by way of the present disclosure over conventional techniques. For example, embodiments of the present disclosure provide better exposure of images by concentrating on higher priority objects. The present disclosure also provides for properly exposed images as part of a mixed or augmented reality scene. In some examples, the present disclosure may even learn and adapt priorities assigned to objects in images.

Certain examples allow exposure to dynamically adjust based upon an eye gaze of a user, as the vector of the eye gaze changes. Examples may also dynamically re-order object priorities based upon movement of a user or resizing a focus reticle in an image.

The present disclosure also allows for an object-based high-dynamic-range (HDR) method in which multiple high priority objects are properly exposed. These and other embodiments of the disclosure, along with many of its advantages and features, are described in more detail in conjunction with the text below and attached figures.

Provided are techniques for updating a setting of a content capture device. For example, a method may include receiving an image captured by the content capture device. In some examples, the image may include a plurality of pixels. In some examples, the image may not be presented to a user. The method may further include identifying a target luma value for the image. In some examples, the target luma value may be determined based upon at least one of an exposure setting or a gain setting of the content capture device.

The method may further include identifying an object in the image, dividing the plurality of pixels of the image into a plurality of pixel groups, and calculating a pixel group luma value for each of the plurality of pixel groups. The method may further include defining a first set of pixel groups not associated with the object, setting weights for each of the pixel groups in the first set of pixel groups, defining a second set of pixel groups associated with the object, and setting weights for each of the pixel groups in the second set of pixel groups. In some examples, the weights for the pixel groups in the second set of pixel groups may be based upon the association between the second set of pixel groups and the object. In some examples, a number of pixels in a first pixel group may be equal to a number of pixels in a second pixel group. In some examples, a first pixel group may be different from a second pixel group.

The method may further include calculating an image luma value using, for each of the plurality of pixel groups, the weight and the pixel group luma value. The method may further include updating a setting (e.g., gain and/or exposure) of the content capture device based upon the computed difference.

In some examples, the method may further include identifying a second object in the image, defining a third set of pixel groups associated with the second object, and setting weights for each of the pixel groups in the third set of pixel groups. The weights set for the second objects may be used when calculating the image luma value.

In some examples, the method may further include identifying additional information associated with the object. In such examples, the additional information may be a category associated with the object, a size of the object, a distance of the object from the content capture device, or a distance that the object is located from a focus reticle of the content capture device. In some examples, the weights for each of the pixel groups in the first set of pixel groups may be based upon the additional information. In some examples, the weights for each of the pixel groups in the first set of pixel groups may be further based upon second additional information. In such examples, the additional information may be different than the second additional information.

As an example, the method may further include identifying additional information associated with the object. The weights for each of the pixel groups in the first set of pixel groups can be based upon the additional information. In another example, the additional information may include a category associated with the object, a size of the object, a distance of the object from the content capture device, or a distance that the object is located from a focus reticle of the content capture device.

In some examples, the method may further include identifying a direction that a user is looking, determining a location on the image that corresponds to the direction the user is looking, and determining a distance that the object is located from the location. In some examples, the weights for each of the pixel groups in the first set of pixel groups may be based upon the additional information. The weights for each of the pixel groups in the first set of pixel groups can be based upon second additional information that is different than the second additional information.

For another example, a method may include receiving an image captured by a content capture device. In some examples, the image may include a plurality of pixels. The method may further include identifying a target luma value for the image. In some examples, the target luma value may be based upon a field of view. The method may further include identifying an object in the image, identifying one or more attributes of the object, and calculating a weight for the object using a neural network. In some examples, the neural network may use the one or more attributes as input. In such examples, an attribute of the one or more attributes of the object may include an object priority, an object distance, or an object size. In some examples, the neural network may be a multilayer perceptron. The method may further include dividing the plurality of pixels of the image into a plurality of pixel groups. In some examples, each pixel group of the plurality of pixel groups may be the same size.

The method may further include defining a first set of pixel groups not associated with the object, and defining a second set of pixel groups associated with the object. The method may further include calculating a pixel group luma value for each pixel group of the second set of pixel groups. The method may further include calculating a pixel group luma value for each pixel group of the second set of pixel groups. The method may further include multiplying the pixel group luma value by the weight to provide a weighted pixel group luma value for each pixel group of the second set of pixel groups.

The method may further include calculating a total luma value for the image. In some examples, the total luma value may include a summation of the weighted pixel group luma values. The method may further include computing a difference between the total luma value and the target luma value and updating a setting of the content capture device based upon the computed difference. In some examples, the setting of the content capture device may be associated with exposure or gain.

The method may further include identifying a second object in the image, identifying one or more second attributes of the second object, defining a third set of pixel groups associated with the second object, and calculating a second weight for the second object using a second neural network. In some examples, the second neural network may use the one or more second attributes as input. The method may further include calculating a second pixel group luma value for each pixel group of the third set of pixel groups. The method may further include multiplying the second pixel group luma value by the second weight to provide a weighted second pixel group luma value for each pixel group of the third set of pixel groups. In some examples, the total luma value may further include a summation of the weighted second pixel group luma values.

For another example, a method may include receiving a first image captured by a content capture device, identifying a first object in the first image, and determining a first update to a first setting of the content capture device. In some examples, the first update may be determined for the first object. In some examples, the first update may be determined using a neural network. The method may further include receiving a second image captured by the content capture device. In some examples, the second image may be captured after the first image. The method may further include identifying a second object in the second image and determining a second update to a second setting of the content capture device. In some examples, the second update may be determined for the second object. In some examples, the first setting and the second setting may be associated with exposure or gain. In some examples, the first setting may be the second setting. In some examples, the first update may be different than the second update. In some examples, the first image and the second image may be in the same field of view. The method may further include performing the first update to the first setting of the content capture device and receiving a third image captured by the content capture device. In some examples, the third image may be captured after the first update is performed. The method may further include performing the second update to the second setting of the content capture device and receiving a fourth image captured by the content capture device. In some examples, the fourth image may be captured after the second update is performed. The method may further include combining the third image and the fourth image into a single image. In some examples, the third image and the fourth image may be combined using an image stitcher.

According to an embodiment of the present invention, a method is provided. The method includes receiving a first image captured by a content capture device and identifying a predetermined number of priority objects in the first image. The predetermined number is greater than or equal to two. The method also includes determining, for each of the predetermined number of priority objects, one or more updates for one or more settings of the content capture device. The method further includes iteratively: updating the content capture device using each of the one or more updates and receiving the predetermined number of images captured by the content capture device using each of the one or more updates. Additionally, the method includes stitching the predetermined number of images together to form a composite image.

For another example, a method may include receiving an image captured by a content capture device. The image may include a plurality of pixels. The method may further include identifying a target luma value for the image, dividing the plurality of pixels of the image into a plurality of pixel groups, calculating a pixel group luma value for each of the plurality of pixel groups, and identifying a location in the image. The location may correspond to a point where a user is looking in an environment corresponding to the image. In some examples, the location may be identified based upon an image of one or more eyes of the user. In other examples, the location may be identified based upon a direction of a gaze of the user. In other examples, the location may be identified based upon a location of an object identified in the image. The method may further include setting weights for each of the plurality of pixel groups based upon the identified location, calculating an image luma value using, for each of the plurality of pixel groups, the weight and the pixel group luma value, computing a difference between the image luma value and the target luma value, and updating a setting of the content capture device based upon the computed difference. The setting may be related to gain or exposure. In some examples, the method may further include dividing the plurality of pixels of the image into a plurality of patches, where a patch may include one or more pixel groups. In such examples, setting weights may be further based upon a distance from a patch that includes the location. In some examples, setting weights may be further based upon a distance from the location.

For another example, a method may include receiving an image captured by a content capture device, where the image includes a plurality of pixels. The method may further include identifying a target luma value for the image, dividing the plurality of pixels of the image into a plurality of pixel groups, calculating a pixel group luma value for each of the plurality of pixel groups, receiving a depth map corresponding to the image, setting weights for each of the plurality of pixel groups based upon the depth map, calculating an image luma value using, for each of the plurality of pixel groups, the weight and the pixel group luma value, computing a difference between the image luma value and the target luma value, and updating a setting of the content capture device based upon the computed difference. The setting may be related to gain or exposure. In some examples, the depth map may indicate a distance from a point in space for one or more points, where each of the one or more points correspond to one or more pixels of the image. In some examples, the method may further include capturing the depth map concurrently with image capture. In other examples, the method may further include capturing the depth map before the image is captured, where the depth map is used to set weights for multiple images. In some examples, setting weights may be further based upon data indicating a location of an object from the image. The data indicating the location of the object may be determined by analyzing pixels of the image to identify one or more pixels of the image that match one or more pixels of a stored image of the object.

For another example, a method may include receiving an image captured by a content capture device, where the image includes a plurality of pixels. The method may further include identifying a target luma value for the image, dividing the plurality of pixels of the image into a plurality of pixel groups, and identifying multiple patches in the image. The multiple patches may include a first patch and a second patch, where the first patch includes one or more pixel groups, and where the second patch includes one or more pixel groups different than the one or more pixel groups of the first patch. In some examples, the multiple patches may be identified based upon the plurality of pixels. In some examples, the multiple patches may be identified based upon one or more objects identified in the image, where the first patch includes pixels associated with a first object. The method may further include calculating, using a first model, one or more weights for the first patch and calculating, using a second model, one or more weights for the second patch. In some examples, the first model may be based upon one or more attributes determined for pixels included in the first patch. In such examples, the second model may be based upon one or more attributes determined for pixels included in the second patch, where the one or more attributes associated with the first model are different than the one or more attributes associated with the second model. In some examples, the first model is a neural network based upon one or more attributes determined for pixels included in the first patch. In some examples, the one or more weights for the first patch may be calculated concurrently with the one or more weights for the second patch. In some examples, the first patch may be a different size than the second patch. The method may further include, for each pixel group, calculating a pixel group luma value and multiplying the pixel group luma value by the weight to provide a weighted pixel group luma value. The method may further include calculating a total luma value for the image, where the total luma value includes a summation of the weighted pixel group luma values. The method may further include computing a difference between the total luma value and the target luma value and updating a setting of the content capture device based upon the computed difference. The setting may be related to gain or exposure.

While methods have been described above, it should be recognized that a computer product may include a computer readable medium storing a plurality of instructions for controlling a computer system to perform an operation of any of the methods described above. In addition, a system may include the computer product and one or more processors for executing instructions stored on the computer readable medium. In addition, a system may include means for performing any of the methods described above. In addition, a system may be configured to perform any of the methods described above. In addition, a system may include modules that respectively perform the steps of any of the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION

Figure 1A:
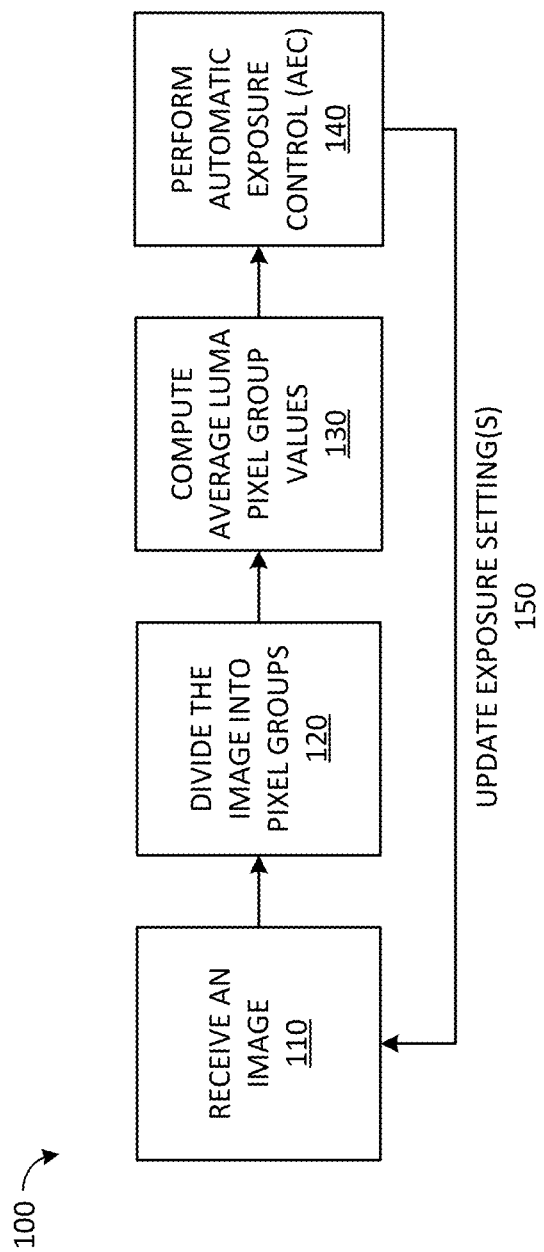
FIG. 1A illustrates an example of a process for updating one or more settings of a content capture device using automatic exposure control.

In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of this disclosure. Rather, the ensuing description of the exemplary embodiments will provide those skilled in the art with an enabling description for implementing an exemplary embodiment. For example, while the description might describe pixel information, images, and/or displaying, it should be recognized that audio may be generated and presented to a user by an augmented reality device instead of or in addition to visual content. It should also be understood that various changes may be made in the function and arrangement of elements without departing from the spirit and scope of the disclosure as set forth in the appended claims.

This disclosure generally relates to determining an exposure setting for a content capture device. The exposure setting may relate to an amount of light a sensor of a content capture device receives when content (e.g., an image or a video) is captured. Examples of exposure settings include a shutter speed, an aperture setting, or an International Standards Organization (ISO) speed.

Traditional solutions for setting exposure were handled by a user. For example, a user would adjust exposure settings to their liking. However, this proved to be unreliable, and often produced suboptimal results.

Today, automatic exposure control (AEC) is a standard feature on cameras. AEC automatically determines exposure settings for an image without user input. Using AEC, a camera may determine an exposure setting for the camera. In some examples, AEC may be run in conjunction with an auto focus control (AF) and/or an auto white balance control (AWB) for a field of view. In such examples, the AEC may be initially used to compute an estimate for an amount of exposure for the field of view. After the estimate is computed, the AF may execute to determine an amount of focus for the field of view. In some examples, after the amount of focus is determined, the AEC may continue executing to fine tune the exposure settings for the field of view. In some examples, the AWB may execute at least partial parallel to the AEC. In such examples, the AWB may finish before or after the AF. In some examples, the AWB may begin executing after the AF is finished. While a field of view is described above, it should be recognized that a scene captured in an image may constitute a field of view.

Described further below are techniques for determining one or more settings (e.g., an exposure setting and/or a gain setting) for a content capture device. In some examples, to determine the one or more settings, luma values of pixels of an image from the content capture device may be identified. Objects in the image and information associated with the objects may also be identified. The information associated with the objects may be divided into categories. And, using the objects and the information, a separate weight array for each category of the information may be computed. The separate weight arrays may be combined to create a total weight array to augment the luma values. The augmented luma values may be aggregated to compute a weighted luma average for the image. Based upon a difference of the weighted luma average and a target, the one or more settings may be adjusted.

In other examples, rather than computing a separate weight array for each category of the information, the information associated with each object may be used in a separate learning based model. Combining the output of each learning based model, a total weight array may be created to augment the luma values of an image. The augmented luma values may be aggregated to compute a weighted luma average for the image. Based upon a difference of the weighted luma average and a target, the one or more settings may be adjusted.

In other examples, a weighting model, as described herein, may be used for an object in an image of a scene. The same weighting model may then be used for other objects in other images of the scene such that an image stitcher may combine the image and the other images together to create an optimized image.

FIG. 1A illustrates an example of a process 100 for updating one or more settings of a content capture device using automatic exposure control (AEC). In some examples, the one or more settings may include an exposure setting, a gain setting, or any combination thereof. In such examples, the exposure setting may be a shutter speed, an ISO speed, or any combination thereof. The gain setting may be digital gain, analog gain, or any combination thereof.

The process 100 may include receiving an image (110). In some examples, the image may be received from a sensor of the content capture device. In other examples, the image may be included in a feed that is supplied to the process 100. It should be recognized that the image may be received from a number of devices and systems.

In some examples, the image may be received at an image buffer. In such examples, the image may be a bit-mapped image that includes pixel information for each pixel of the image. In some examples, the image buffer may be a size equal to a pixel height and pixel width of the image. To illustrate, the image buffer size may be 640×480, where 640 may correspond to a width in number of pixels of the image, and 480 may correspond to a height in number of pixels of the image.

The process 100 may further include dividing the image into pixel groups (120). A size and shape of each pixel group may be predefined. In some examples, the size and shape of each pixel group may be the same or vary. For illustration purposes, the pixel groups will be described as rectangles. However, it should be recognized that the pixel groups may be of any shape that divides the image into a plurality of portions. For example, the pixel groups may be radial from a center of the image. In such an example, each pixel group may include a different range of diameters (e.g., a first radial may be from 0 to 1 units from the center, a second radial may be from 1 to 2 units from the center, and a third radial may be from 2 to 3 units from the center). For another example, the pixel groups may be associated with each object (e.g., a first object may be a first pixel group, a second object may be a second pixel group, and the rest of the image may be a third pixel group). It should also be recognized that the pixel groups may be in any other form that divides the image into a plurality of portions. In some examples, a pixel group may be arranged such that two or more pixel groups are overlapping.

In one illustrative example, the image may be divided into 96 pixel groups (12 pixel groups×8 pixel groups, where 12 corresponds to the number of pixel groups along a width of the image and 8 corresponds to the number of pixel groups along a height of the image). In such an illustration, having 12×8 pixel groups in a 640×480 image, would mean that each pixel group would have a height of approximately 50 pixels and a width of approximately 60 pixels. While this illustration indicates that the width and height of each pixel group would be different, it should be appreciated that the width of a pixel group may be the same as the height of the pixel group.

The process 100 may further include computing average luma pixel group values for each pixel group of the image (130). In some examples, an average luma pixel group value may be computed by accumulating luma values for each pixel of a pixel group. In such examples, luma values may represent the brightness of an image (e.g., an achromatic portion of an image). In some examples, a luma value may be a representation of an image without a color component. For example, in a YUV colorspace, a luma value may be the Y. In some examples, a luma value is a weighted sum of gamma-compressed RGB components of an image. In such examples, the luma value may be referred to as gamma-corrected luma. In some examples, accumulation may be performed by software or hardware by adding up luma values for each pixel of the pixel group. Once the luma values for a pixel group are accumulated, the total number may be divided by the number of pixels in the pixel group to compute an average luma pixel group value for the pixel group. This process may be repeated for each pixel group in the image.

The process 100 may further include performing AEC (140). The AEC may take as input the average luma pixel group values for each pixel group of the image. In some examples, an AEC method may apply weights to the average luma pixel group values described above using a weight array. In such examples, the AEC may also take as input the weight array, which may identify a weight to apply to each pixel group of the image.

In some examples, a weight array may include pixel groups that correspond to the pixel groups created by dividing the image. For example, if the image is divided into 25 pixel groups (5 pixel groups×5 pixel groups), the weight array may include weights for 25 pixel groups (5 pixel groups×5 pixel groups). In such an example, the top left most pixel group in the image may correspond to the top left most pixel group in the weight array, and so on. In some examples, values for each pixel group in the weight array may be based upon a number of techniques discussed herein, including metering, object priority, focus reticle, eye gaze, normalized total weight array, learning based methods, the like, or any combination thereof.

In some examples, a weight array (e.g., a weight array described in FIGS. 1-7 and 10) may be combined with the average luma pixel group values to compute weighted luma pixel groups. For example, each average luma pixel group value may be multiplied by a corresponding weight. In other examples, a weight array may be combined with luma values of pixels based upon pixel groups created. In such examples, a weight to apply to a pixel may be determined based upon a pixel group that includes the pixel. For example, if a pixel is in the top left pixel group in the image, a weight associated with the top left pixel group in the weight array may be applied to the pixel. In some examples, a weight associated with a pixel group may be multiplied by each pixel in a corresponding pixel group of the image to compute a weighted luma value for each pixel of the corresponding pixel group.

In some examples, the weighted luma values may be averaged together to create a weighted luma average for an image. In some example, the weighted luma average may be expressed as:

$$WLA = \frac{\sum_{r=0}^{M-1}\sum_{c=0}^{N-1} w[r, c] \cdot luma_{avg}[r, c]}{\sum_{r=0}^{M-1}\sum_{c=0}^{N-1} w[r, c]},$$

where WLA is the weighted luma average, M is a height of a pixel group, N is a width of a pixel group, w[r,c] is location r and location c in a weight array, and $luma_{avg}[r,c]$ is an average luma value of a pixel at location r and location c.

In other examples, the weight array may be used for local tone mapping. For example, a local tone mapping system may use the weighted array to identify portions of a field of view that should be brightened. This technique may deal with portions of the field of view, rather than the entire field of view as would some examples of the averaging techniques described above. In some examples, a setting (e.g., an exposure setting and/or a gain setting) may be applied to one or more portions based upon the weight array. In such examples, the weight array may be used as a guide for the local tone mapping.

In some examples, the local tone mapping may be performed on pixels that are above a predefined threshold, where the threshold corresponds to a weight of the weight array. For example, a pixel that is given a weight above the threshold may have the local tone mapping system determine an adjustment of a setting (e.g., an exposure setting and/or a gain setting) for the pixel. In some examples, the pixel and one or more neighboring pixels may be used when comparing to the threshold. For example, the pixel and the one or more neighboring pixels would have to be above the threshold for the local tone mapping to apply to the pixel and/or the one or more neighboring pixels. In some examples, local tone mapping may be supported in software and/or hardware.

In some examples, the process 100 may further include updating one or more settings. As described above, the one or more settings may include an exposure setting, a gain setting, or any combination thereof. In such examples, the exposure setting may be a shutter speed, an ISO speed, or any combination thereof. In some examples, the shutter speed may be a global shutter or a rolling shutter. The global shutter may indicate a duration of time to expose all pixels of a field of view. The rolling shutter may indicate a duration of time to expose a row (either horizontally or vertically) of a field of view. In the rolling shutter, lines of an image may be scanned in a rolling manner rather than a snapshot of the field of view. The gain setting may be digital gain, analog gain, or any combination thereof. For example, a gain setting may be 8× by having an analog gain of 2× and a digital gain of 4×. In some examples, the exposure setting may be adjusted before the gain setting when increasing exposure. In such examples, the gain setting may be adjusted before the gain setting when decreasing exposure.

Figure 1B:
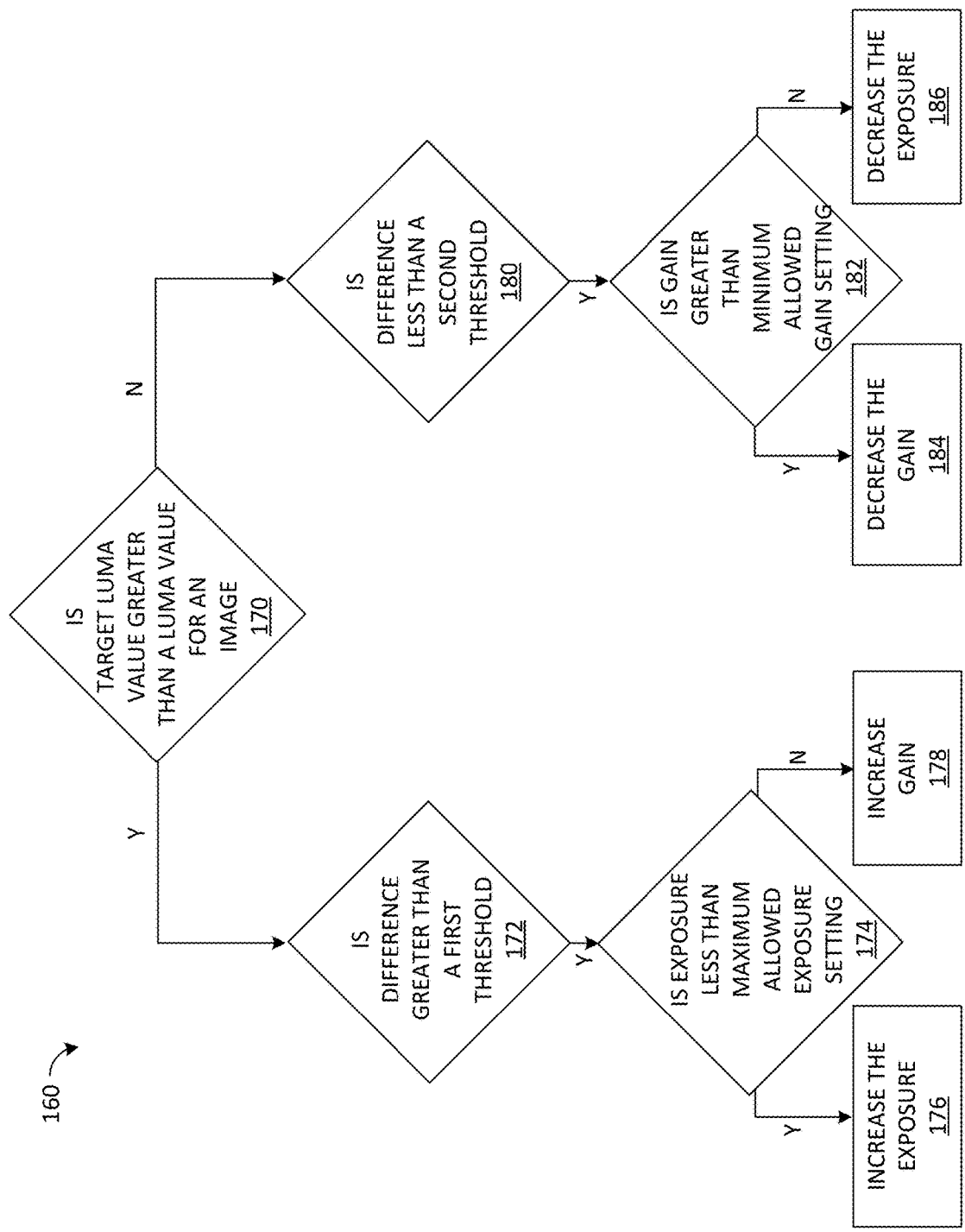
FIG. 1B illustrates an example of a process for determining how to update one or more settings of a content capture device.

FIG. 1B illustrates an example of a process 160 for determining how to update one or more settings of a content capture device. The process may include comparing a target luma value to a luma value (e.g., a weighted luma average) (step 170).

If the weighted luma average is less than the target luma average by a predefined first threshold, the one or more settings may be adjusted to make an image brighter (step 172). For example, if an exposure setting of the one or more settings is not at a maximum allowed exposure setting, the exposure setting may be increased (e.g., incrementally increased) up to the maximum allowed exposure setting (steps 174 and 176). In one illustrative example, the maximum allowed exposure setting may be 16.6 ms for a frame rate of 30 frame per second. However, it should be recognized that the maximum allowed exposure setting could be different, even for a frame rate of 30 frames per second. The maximum allowed exposure setting may be based upon the ISO speed and the content capture device. In some examples, the software and/or hardware of the content capture device may determine a maximum allowed exposure setting (e.g., the maximum allowed exposure setting may be less than the frame period (1/frame rate) minus a time to transfer an image between a sensor and a host processor). In some examples, the maximum allowed exposure setting may be less than what the software and/or hardware allows.

If the exposure setting is at the maximum allowed exposure setting, a gain setting of the one or more settings may be increased (e.g., incrementally increased) up to a maximum allowed gain setting (steps 174 and 178). In one illustrative example, the maximum allowed gain setting may be 8×. However, it should be recognized that the maximum allowed gain setting could be different. The maximum allowed gain setting may be based upon an image quality desired (e.g., noise in an image may increase as the gain setting increases) and software and/or hardware of the content capture device (e.g., a sensor may support up to a certain gain setting).

If the weighted luma average is more than the target luma average by a predefined second threshold (which may be the same or different than the first threshold), the one or more settings may be adjusted to make the image darker (step 180). For example, if the gain setting is not at a minimum allowed gain setting (e.g., 1×), the gain setting may be decreased (e.g., incrementally decreased) down to the minimum allowed gain setting (steps 182 and 184). In some examples, the minimum allowed gain setting may be determined based upon software and/hardware of the content capture device (e.g., a sensor of the content capture device).

If the gain setting is at the minimum allowed gain setting, the exposure setting may be decreased (e.g., incrementally decreased) down to a minimum allowed exposure setting (e.g., 20 μsec) (steps 182 and 186). The minimum allowed exposure may correspond to an amount of time that a field of view should be exposed based upon software and/or hardware of the content capture device (e.g., a sensor of the content capture device). The amount of adjustment for either situation may be based upon an amount of difference that the weight luma average is from the target luma average.

In some examples, the target luma average may be provided. In such examples, the target luma average may be provided and used until a new target luma average is provided. In other examples, a plurality of target luma averages may be provided for different situations. For example, the target luma average may be slightly higher outside than indoors because it may be brighter outdoors. Accordingly, in some examples, two different target luma averages may be provided or determined: one for indoor and one for outdoor. In other examples, the target luma average may be determined. In such examples, a current physical environment may be determined based upon one or more sensors. For example, the one or more sensors may detect an amount of light in the current physical environment. In some examples, any combination of the one or more settings may be used to determine the target luma value.

Figure 2:
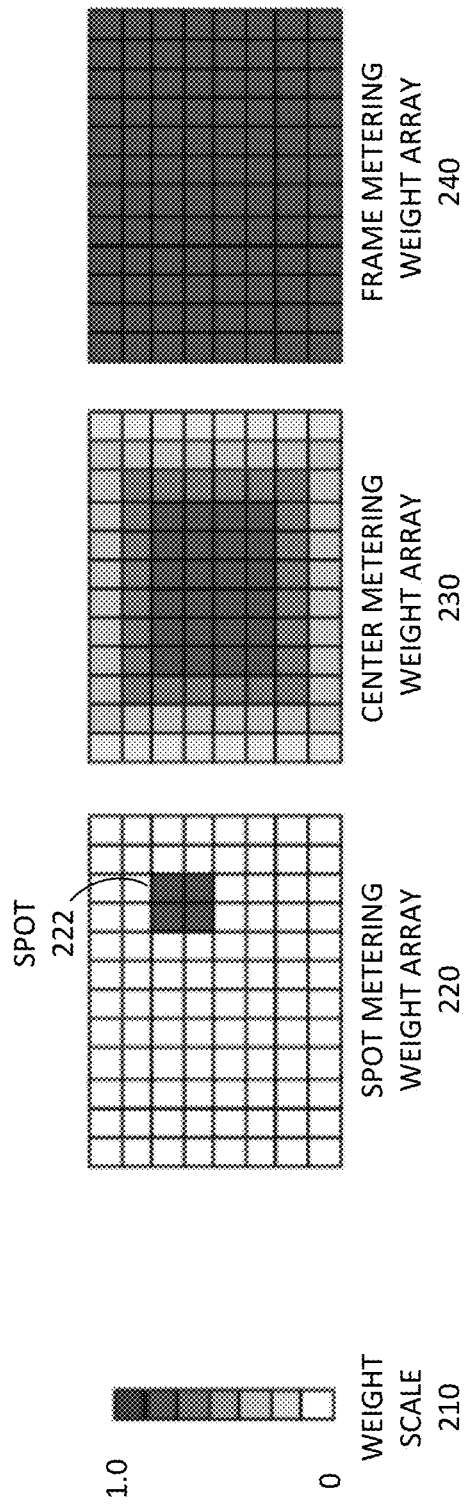
FIG. 2 illustrates examples of various metering techniques for weighting luma values.

FIG. 2 illustrates examples of various metering techniques for weighting luma values. For the various metering techniques, a weight scale 210 has been provided to be a key for particular weights. Each level of the weight scale 210 includes a color that corresponds to a particular weight when included in a weight array. For example, the top box in the weight scale 210 is the darkest color and represents a weight of 1 and the bottom box in the weight scale 210 is the lightest color and represents a weight of 0. While the weight scale 210 appears to linearly change from the top box to the bottom box, it should be appreciated that the weight scale 210 may be different as long as the weight scale 210 is consistent throughout a single image. In some examples, two or more of the metering techniques described below may be combined in a single weight array.

A first metering technique may be spot metering. In some examples, spot metering may refer to giving the same weight to each pixel of a selected region of an image. In such examples, the spot metering may be implemented to give diminishing weight moving further from the selected region. In some examples, the selected region may be identified based upon a motion of a user (e.g., by making a motion of a screen touch in a field of view). In such examples, a finger moving from a first position to a second position in midair could correspond to selecting a region. While there would not be an actual screen that the user is touching, the motion itself may be detected. Another way that a region may be selected would be by putting fingers together in a way that roughly creates a circle, and everything inside of the circle would be the selection. In other examples, a virtual frame may appear that may be moved by a user. In such examples, a circle may be shown in a display of a user that may be moved and/or resized.

Spot metering may cause a first weight to be assigned to one or more first pixel groups and a second weight to be assigned to one or more second pixel groups. Typically, the one or more first pixel groups are identified based upon a user selection. For example, a user may put a finger on a screen to indicate a spot. The location of the finger may define the one or more first pixel groups to be used for spot metering. A result of spot metering may be a spot metering weight array 220. As may be seen, the spot metering weight array 220 includes a spot 222. The spot 222 may be a location identified based upon a user selection (e.g., the one or more first pixel groups). The spot 222 includes a first weight, which appears to be 1. The rest of the spot metering weight array 220 (e.g., the one or more second pixel groups) includes a second weight, which appears to be 0. It should be appreciated that different weights may be used. It should also be appreciated that more than one spot may be identified.

A second metering technique may be center metering. In some examples, center metering may refer to giving larger weights to groups of pixels at a center of an image and a diminishing weight moving toward edges of the image.

Center metering may cause a plurality of weights to be assigned to pixel groups based upon a distance from a point (e.g., a center) of a weight array. A result of center metering may be a center metering weight array 230. The center metering weight array 230 may include a first weight for a particular distance away from the center. The first weight may be the largest weight. In the center metering weight array 230, the first weight is included in two pixel groups vertically from the center and three pixel groups horizontally from the center. This illustrates that the distance from the center may be different horizontally and vertically. It should also be appreciated that the center metering may also vary in other ways, including diagonally.

The center metering weight array 230 may also include a second, a third, a fourth, and a fifth weight, each of which are one pixel group away from a previous weight. In some examples, each successive level of weight may decrease in weight. For example, the fifth weight may be less than the fourth weight, which may be less than the third weight, which may be less than the second weight, which may be less than the first weight. Again, it should be appreciated that the center metering weight array is just an example, and that other configurations of each level of weight and the particular weights may be used.

A third metering technique may be image metering. Image metering may cause a single weight to be assigned to every pixel group of a weight array. A result of image metering may be an image metering weight array 240. The image metering weight array 240 includes a single weight for every pixel group. Image metering may produce an average exposure for an entire scene.

In some examples, in addition to (or instead of) metering, one or more objects in an image may be assigned a priority that affects a weight array for the image. By assigning weights for the weight array based upon the one or more objects, the one or more objects may remain properly exposed throughout multiple images even if the one or more objects are moving in relation to the image and the weight array. The one or more objects may be properly exposed through multiple images because weights are not being applied to a single position every time, but rather change based upon the one or more objects.

Figure 3:
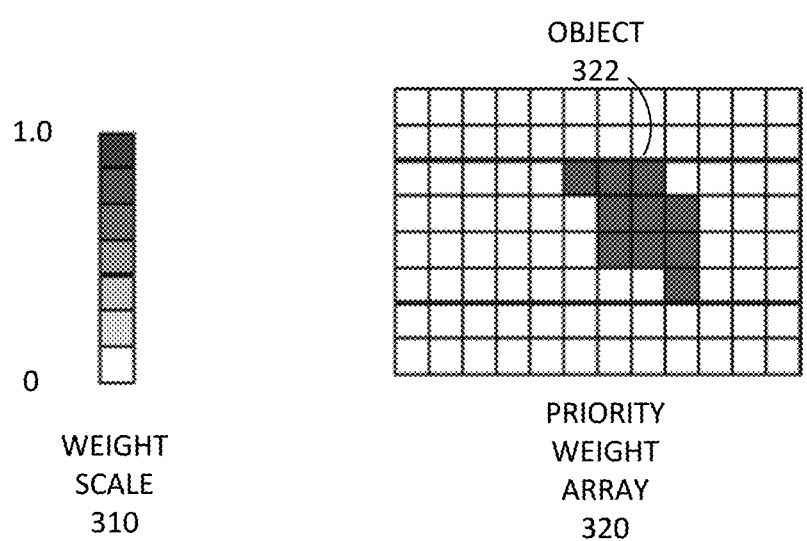
FIG. 3 illustrates an example of a priority weight array for an object.

FIG. 3 illustrates an example of a priority weight array 320 for an object in an image. Similar to above, a weight scale 310 has been provided to be a key for particular weights. In some examples, the object in the image may be identified by an object recognition system. In such examples, the object recognition system may identify a category of an object (e.g., a person, an animal, a chair, or the like). In other examples, the identification may identify one or more additional details of an object (in addition to the category of an object). For example, an identity of a person may be identified, an identification of an animal (e.g., this is a golden retriever or this is Spot), or the like. The object recognition system may also determine pixel groups that include the object.

In one illustrative example, a table as illustrated below may be used to assign a weight to an identified object. Using such a table, when an object is identified, one or more pixel groups that are identified for the object are assigned a priority weight in the table.

| Object | Priority | Priority Weight |
|---|---|---|
| Active Object | 1 | 1.0 |
| User Selected Object | 2 | 0.95 |
| Identified People | 3 | 0.9 |
| People | 4 | 0.85 |
| Identified Pets | 5 | 0.8 |
| Pets | 6 | 0.75 |
| Cars | 7 | 0.70 |
| Flowers | 8 | 0.65 |
| Buildings | 9 | 0.60 |
| Insects | 10 | 0.55 |
| Trees/Shrubs | 11 | 0.50 |
| Artwork | 12 | 0.45 |
| Furniture | 13 | 0.40 |
| Other | 14 | 0.35 |

In some examples, an active object (as indicated in the table above) may represent an object that is actively in use by an application. For example, a surface may be in use by a mixed reality application. In such an example, a character may be dancing on the surface. To ensure that the surface is a priority, weights associated with the surface may be greater than weights for other areas of an image.

In some examples, a user-selected object (as indicated in the table above) may represent an object that has been selected by a user, similar to the spot metering described above. However, unlike spot metering, the user-selected object may include all pixel groups that the object is included in rather than just the pixel groups that a finger covers.

In some examples, an identified person (as indicated in the table above) may represent a person in an image that has been identified by a face recognition system (or other identification system). For example, the face recognition system may recognize a person as Clark Kent. In such an example, Clark Kent may be included in a list of identified people that should be assigned a higher weight. In addition, in some examples, particular people may be assigned different weights. In some examples, people not included in the list, and/or people not identified by name, may be given a weight different than identified people (such as indicated by "people" in the above table).

Similarly, an identified pet (as indicated in the table above) may represent a pet in an image that has been identified by a face recognition system (or other identification system). For example, the face recognition system may recognize a pet as Dixie. In such an example, Dixie may be included in a list of identified pets that should be assigned a higher weight. In addition, in some examples, particular pets may be assigned different weights. In some examples, pets not included in the list, and/or pets not identified by name, may be given a weight different than identified pets (such as indicated by "pets" in the above table).

In some examples, one or more other categories of objects (as indicated in the table above) that are identified may be assigned various weights (e.g., pets, cars, flowers, buildings, insects, trees/shrubs, artwork, furniture, or the like). In such examples, each category may be assigned a weight that may be applied to all pixel groups that include the object. In some examples, any pixel group that does not include an object may be assigned a different weight (such as indicated by "other" in the above table). In such examples, the different weight may be zero or some other non-zero number. In most examples, the different weight may be less than one or more of the other weights. In some examples, the different weight may vary depending on a distance away from an identified object.

In some examples, the weights, the priorities, and the object types of the table may be predefined. In some examples, the weights, the priorities, and the object types may adjust over time based upon learning from actions of a user. For example, if a user predominately captures images that include a particular object, that object may be assigned a higher priority. For another example, the weights may change based upon one or more actions of a user in relation to a number of images of a similar scene. For example, based upon which images are deleted, the priority weights may be updated to the preferences of the user. Similar to deleting, images that are shared with others may indicate that the one or more settings for that image were optimal.

Referring back to FIG. 3, an area of the image may be identified that includes an object 322. Based upon what the object 322 is identified as, one or more pixel groups of the priority weight array 320 that include the object 322 may be assigned a first weight. In some examples, one or more pixel groups of the priority weight array 320 that are not included in the object 322 may be assigned a second weight. While the priority weight array 320 illustrates the object 322 having a weight of 1 and the one or more pixel groups that are not included in the object 322 having a weight of 0, it should be recognized that any weight may be assigned to the object 322 as well as the one or more pixel groups that are not included in the object 322.

Figure 4:
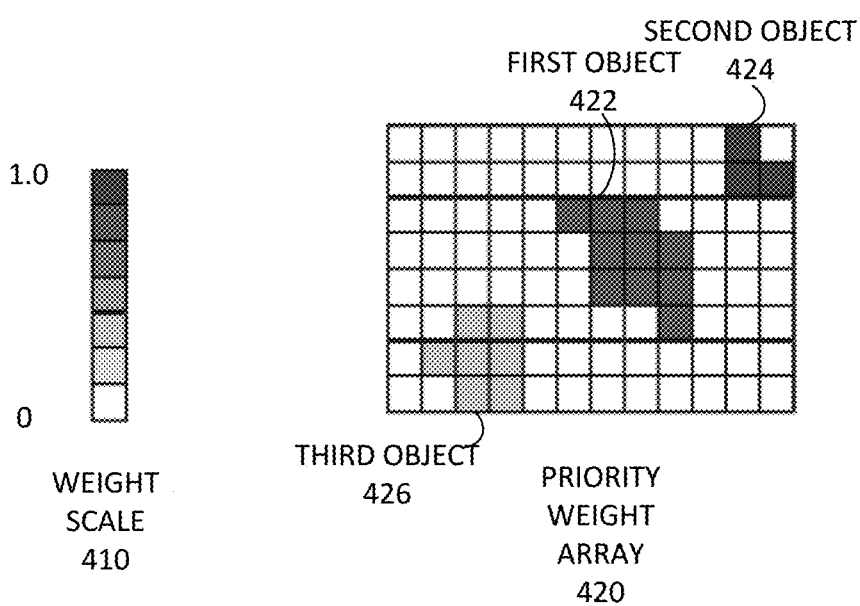
FIG. 4 illustrates an example of a priority weight array for multiple objects.

FIG. 4 illustrates an example of a priority weight array 420 for multiple objects. Similar to above, a weight scale 410 has been provided to be a key for particular weights. In some examples, one or more objects may be identified in an image. In such examples, an AEC may determine to execute using a subset of the one or more objects identified in the image. For example, if more than one object is identified in the image, the AEC may determine to execute using only one of the objects. In some examples, the AEC may determine to execute based upon an object with the highest priority. In other examples, the AEC may determine to execute based upon one or more of the objects identified, but not all of the objects identified. In other examples, the AEC may determine to execute based upon all objects identified.

In one illustrative example, the one or more objects may include a first object 422, a second object 424, and a third object 426. In some examples, each object may be assigned a weight. In some examples, two or more weights may be similar and/or two or more weights may be different. For example, the first object 422 may be an active object (as described in the table above), the second object 424 may be a user-selected object (as described in the table above), and the third object 426 may be a car (as described in the table above).

Figure 5:
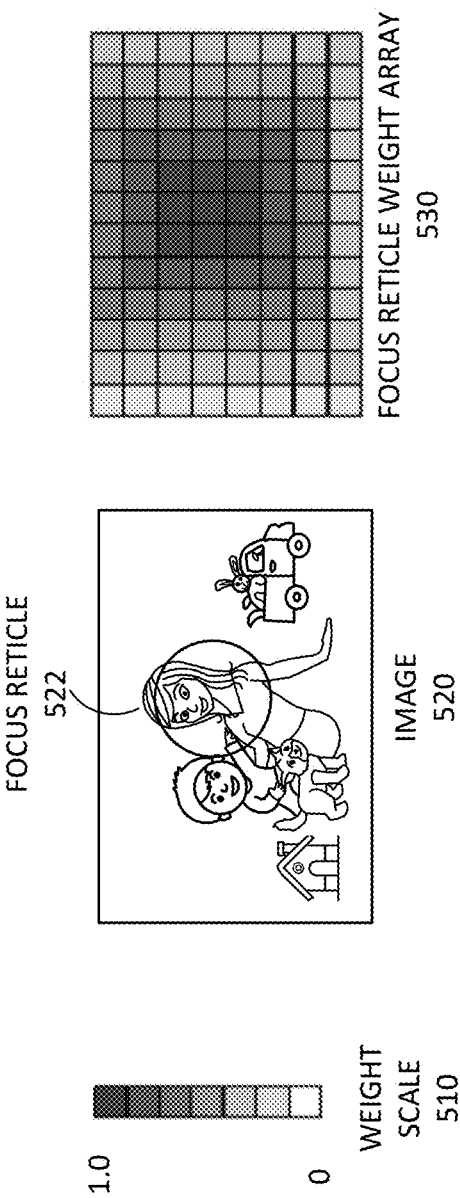
FIG. 5 illustrates an example of a focus reticle weight array.

FIG. 5 illustrates an example of a focus reticle weight array 530. Similar to above, a weight scale 510 has been provided to be a key for particular weights. In some examples, the focus reticle weight array 530 may identify a location of a focus reticle 522 in the image 520. In some examples, the focus reticle 522 may be adjusted based upon hand gestures, an automatic focus control (AF) (as described above), and/or resizing of the focus reticle 522. In some examples, a hand gesture may form or draw the focus reticle 522. In such examples, if an object is inside of the focus reticle 522, pixel groups of the object may be given a higher weight. If an object is on the boundary of the focus reticle 522, pixel groups of the object may be given a lesser weight. If an object is out of the focus reticle 522, pixel groups of the object may be given the lowest weight. In some examples, the focus reticle 522 may be resized using a command either on a content capture device or remote from the content capture device (e.g., a hand gesture, a remote device, or the like). In other examples, AF may indicate an area of the image 520 that is the focus of the image 520. In such examples, objects in the area may be given a higher weight.

In some examples, similar to the center metering weight array 230, weights of the focus reticle weight array 530 may decrease as distance increases from the center of the focus reticle 522. For example, the center of the focus reticle 522 may have the highest weight. Pixel groups around the center may also have the highest weight. But, as distance increases from the center, the pixel groups may decrease in amount of weight.

In other examples, the focus reticle weight array 530 may be utilized with an object identification system to increase the weight of pixel groups that include objects that are at least partially within the focus reticle 522. For example, if the object is overlapping or completely contained in the focus reticle 522, the weight of the pixel groups that include the object may be increased. If the object is completely outside of the focus reticle 522, the weight of the pixel groups that include the object may be decreased.

Figure 6:
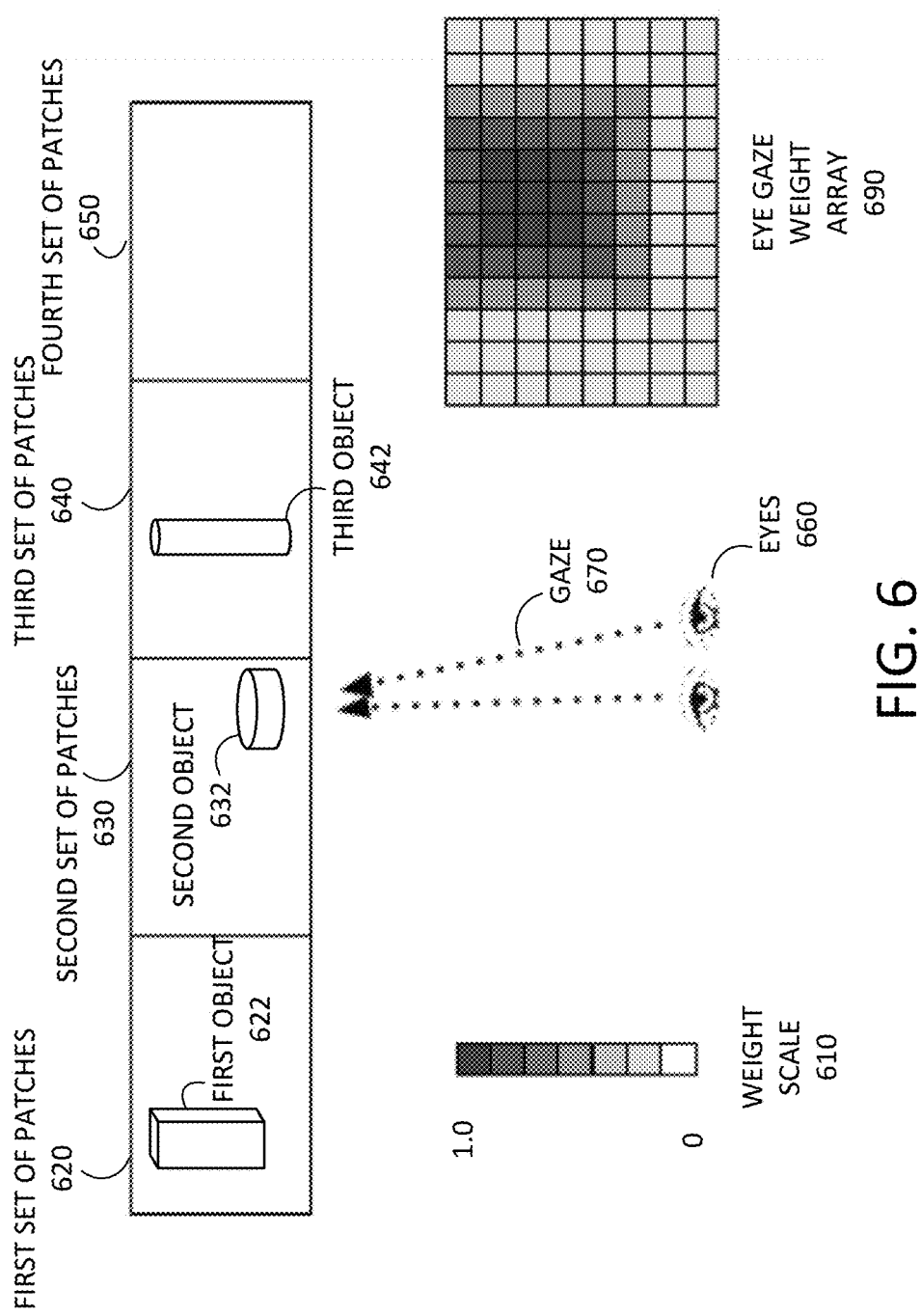
FIG. 6 illustrates an example of an eye gaze weight array.

FIG. 6 illustrates an example of an eye gaze weight array 690. Similar to above, a weight scale 610 has been provided to be a key for particular weights. To implement the eye gaze weight array 690, a system may include one or more eye capture devices. An eye capture device may be used to capture one or more images and/or one or more videos of one or more eyes (e.g., eyes 660) of a user. The images and/or videos may be further processed to determine a gaze 670 of the eyes 660. In some examples, the gaze 670 may indicate a direction that the eyes 660 are looking or a location that the eyes 660 are looking at.

In some examples, the gaze 670 may also indicate a depth that the eyes 660 are looking based upon the eyes 660 of the user. In some examples, by looking at a left eye and a right eye, a system may determine that the gaze 670 is looking at a particular object at a particular depth. In some examples, similar to the center metering weight array 230, weights of the eye gaze weight array 690 may decrease as distance increases from a location that the gaze 670 is looking. For example, the center of the location that the gaze 670 is looking may have the highest weight. Pixel groups around the center may also have the highest weight. But, as distance increases from the center, the pixel groups may decrease in amount of weight.

To illustrate the eye gaze weight array 690, the gaze 670 may be pointing to a second set of pixel groups 630, which may include a second object 632. The pixel groups that include the second object 632 may be assigned the highest weight. Then, weights may be assigned based upon a distance away from the second object 632 and/or based upon other objects that are identified.

For example, a first object 622 in a first set of pixel groups 620 and a third object 642 in a third set of pixel groups 640 may be identified. In such an example, the first set of pixel groups 620 may be assigned a weight corresponding to the distance from the second object 632 and an identification of the first object 622. If the first object 622 is an object with a high priority, the weights of the first set of pixel groups may be increased. On the other hand, if the first object 622 is an object with a low priority, the weights of the first set of pixel groups may be decreased. A similar operation may be performed for the third set of pixel groups 640 and the third object 642. In some examples, no object may be identified in a set of pixel groups (e.g., the fourth set of pixel groups 650). When no object is identified, the set of pixel groups may be assigned a default value or a value based upon a distance from one or more of the objects (e.g., the second object 632) or a location of the gaze 670.

Figure 16:
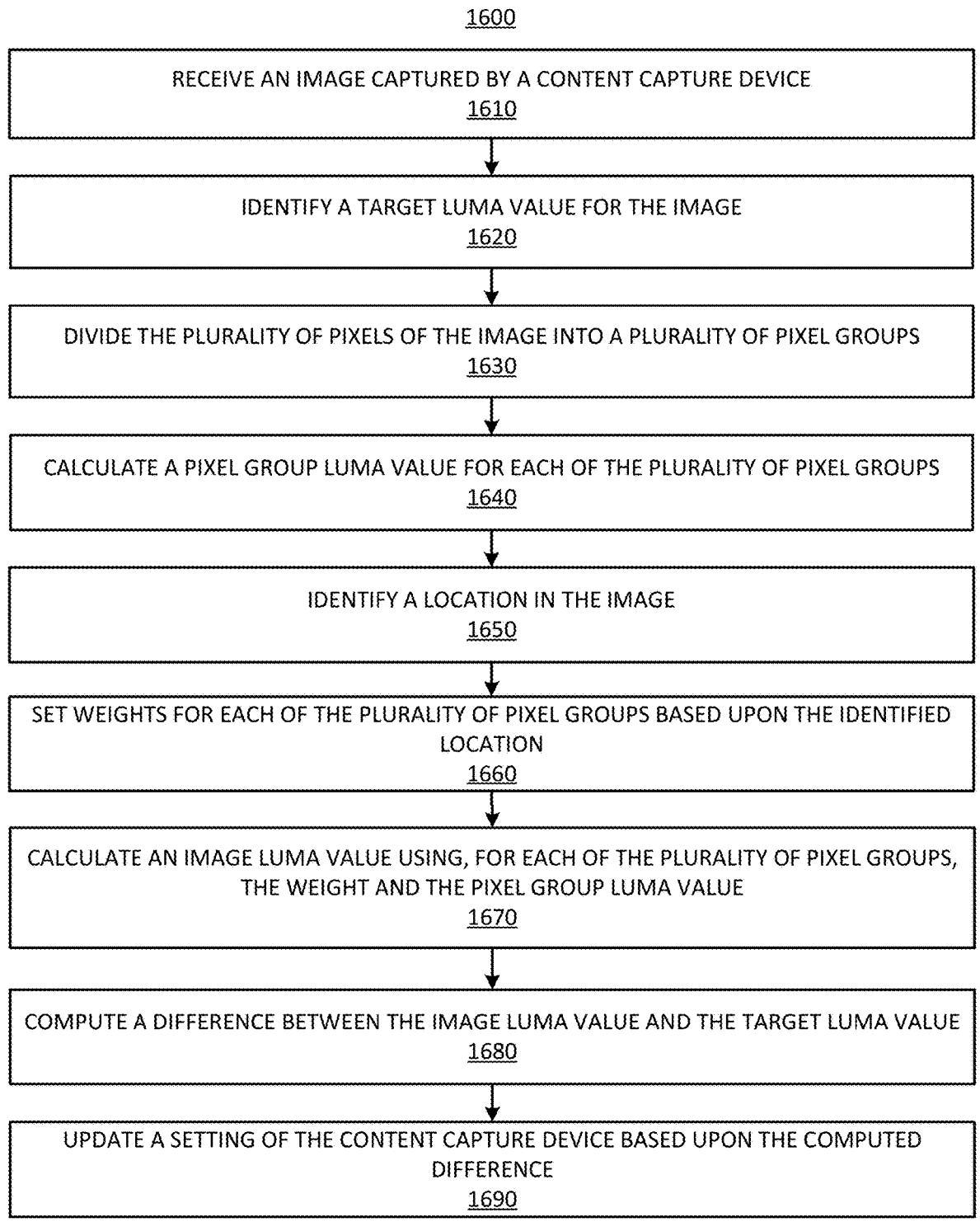
FIG. 16 is a flowchart illustrating an embodiment of a process for automatic exposure control using a location identified based upon a gaze of a user.

FIG. 16 is a flowchart illustrating an embodiment of a process 1600 for automatic exposure control using a location identified based upon a gaze of a user. In some aspects, the process 1600 may be performed by a computing device (e.g., a content capture device such as a camera).

The process 1600 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

The process 1600 may include receiving an image captured by a content capture device (1610). In some examples, the image may include a plurality of pixels. In some examples, the image may be received from a camera or other content capture device. In other examples, the image may be received from a feed (or stream) of images. In such examples, the feed may be current or past images. FIG. 6 illustrates the image as including the first set of patches 620, the second set of patches 630, the third set of patches 640, and the fourth set of patches 650. It should be recognized that the image may include more or less sets of patches than illustrated in FIG. 6.

The process 1600 may further include identifying a target luma value for the image (1620). In some examples, the target luma value may indicate an optimal amount of luma for an image. In such examples, each pixel of the image may be associated with a luma value. In some examples, the target luma value may correspond to an average of the luma values of the image.

In other examples, the target luma value may correspond to a weighted average of the luma values of the image. In other examples, the target luma value may correspond to numbers that would result from multiplying a weight array with luma values.

In some examples, the target luma value may be predefined. In other examples, the target luma value may be determined based upon one or more sensors. For one illustrative example, a sensor may detect an amount of light in an environment. Based upon the amount of light, the target luma value may be set. In such an example, there might be thresholds for the target luma value. For example, if the amount of light is above a certain amount, the target luma value may be a certain amount.

The process 1600 may further include dividing the plurality of pixels of the image into a plurality of pixel groups (1630). In some examples, a pixel group may represent a contiguous (or adjacent/adjoining) group of pixels. In such examples, a shape of the pixel group may vary. For example, each pixel group may be a rectangle or square such that the image is divided into rows and columns. In other examples, each pixel group may include a certain number of pixels from a center of the image. In some examples, different pixel groups may be different shapes (e.g., if a pixel group is created such that it includes an object). In some examples, pixel groups may be of different size. In some examples, a pixel group may be arranged such that two or more pixel groups are overlapping.

The process 1640 may further include calculating a pixel group luma value for each of the plurality of pixel groups (1640). In some examples, the pixel group luma value for a pixel group may include an average of luma values for each pixel of the pixel group. In other examples, the pixel group luma value may be a sum of the luma values for each pixel of a pixel group. In other examples, the pixel group luma value may be a difference between luma values of each pixel and an average luma value for the image. For example, an average luma value may be computed for the image, taking into account every pixel. The average luma value may then be used to compute a difference for each pixel such that a difference from the average luma value is generated for a pixel group. It should be recognized that other summary values of luma values of a pixel group may be used.

The process 1600 may further include identifying a location in the image (1650). The location may correspond to a point where a user is looking in an environment (i.e., a physical area where the user is located) corresponding to the image. For example, the image may correspond to a general direction that a user is looking. The location may be the position in the image at which it is determined that the user is actually looking.

In some examples, the location may be identified based upon an eye image of one or more eyes of the user. The eye image may be separate from the image described above. In such examples, the eye image may be analyzed to identify where the user is looking. For example, each set of one or more pixels of the eye image may be determined to correspond to a different set of one or more pixels of the image. In such an example, if the one or more eyes in the eye image are determined to be looking at a particular set of one or more pixels of the eye image, the location in the image may be identified as a set of one or more pixels of the image that correspond to the particular set of one or more pixels of the eye image. It should be recognized that more than one eye image may be used. For example, an eye image of a first eye and an eye image of a second eye may be used. In some examples, the location may correspond to a location of an object identified in the image. It should also be recognized that other methods for identifying where a user is looking based upon an eye image of one or more eyes of the user may be used.

In other examples, the location may be identified based upon a direction of a gaze of the user. In such examples, instead of using an eye image of one or more eyes of the user, an orientation of a device worn by the user may be used. In one illustrative example, the orientation may include one or more from the set of pitch, yaw, and roll. In such an example, a sensor (e.g., gyroscope) that measures the orientation of the device may be included with the device. It should be recognized that other methods for identifying where a user is looking based upon an orientation of a device may be used.

The process 1600 may further include setting weights for each of the plurality of pixel groups based upon the identified location (1660). For example, pixels groups that correspond to locations that are closer to the identified location may be set as higher weights than pixels groups that correspond to locations that are farther from the identified location. It should be recognized that weights may be set according to other methods. FIG. 6 illustrates weights set for pixel groups in the eye weight array 690.

In some examples, the process 1600 may further include dividing the plurality of pixels of the image into a plurality of patches, where a patch includes one or more pixel groups. In such examples, setting weights may be further based upon a distance from a patch that includes the location. FIG. 6 illustrates dividing the plurality of pixels of the image into a plurality of patches. For example, a first patch may be the first set of patches 620, a second patch may be the second set of patches 630, a third patch may be the third set of patches 640, and a fourth patch may be the fourth set of patches 650. It should be recognized that the image may be divided into more or less sets of patches than illustrated in FIG. 6.

The process 1600 may further include calculating an image luma value using, for each of the plurality of pixel groups, the weight and the pixel group luma value (1670). In some examples, calculating the image luma value may include summing each of the weighted pixel group luma values, where a weighted pixel group luma value may be computed by multiplying a weight associated with a pixel group with a luma value associated with the pixel group.

The process 1600 may further include computing a difference between the image luma value and the target luma value (1680), and updating a setting of the content capture device based upon the computed difference (1690). In some examples, the setting may be an exposure setting or a gain setting. In such examples, the exposure setting may be a shutter speed, an ISO speed, or any combination thereof. In some examples, the shutter speed may be a global shutter or a rolling shutter. The global shutter may indicate a duration of time to expose all pixels of a field of view. The rolling shutter may indicate a duration of time to expose a row (either horizontally or vertically) of a field of view. In the rolling shutter, lines of an image may be scanned in a rolling manner rather than a snapshot of the field of view. The gain setting may be digital gain, analog gain, or any combination thereof. For example, a gain setting may be 8× by having an analog gain of 2× and a digital gain of 4×. In some examples, the exposure setting may be adjusted before the gain setting when increasing exposure. In such examples, the gain setting may be adjusted before the exposure setting when decreasing exposure. In some examples, the amount of adjustment may be proportional to the difference. For example, the adjustment may be larger if the difference between the image luma value and the target luma value is larger.

Figure 7:
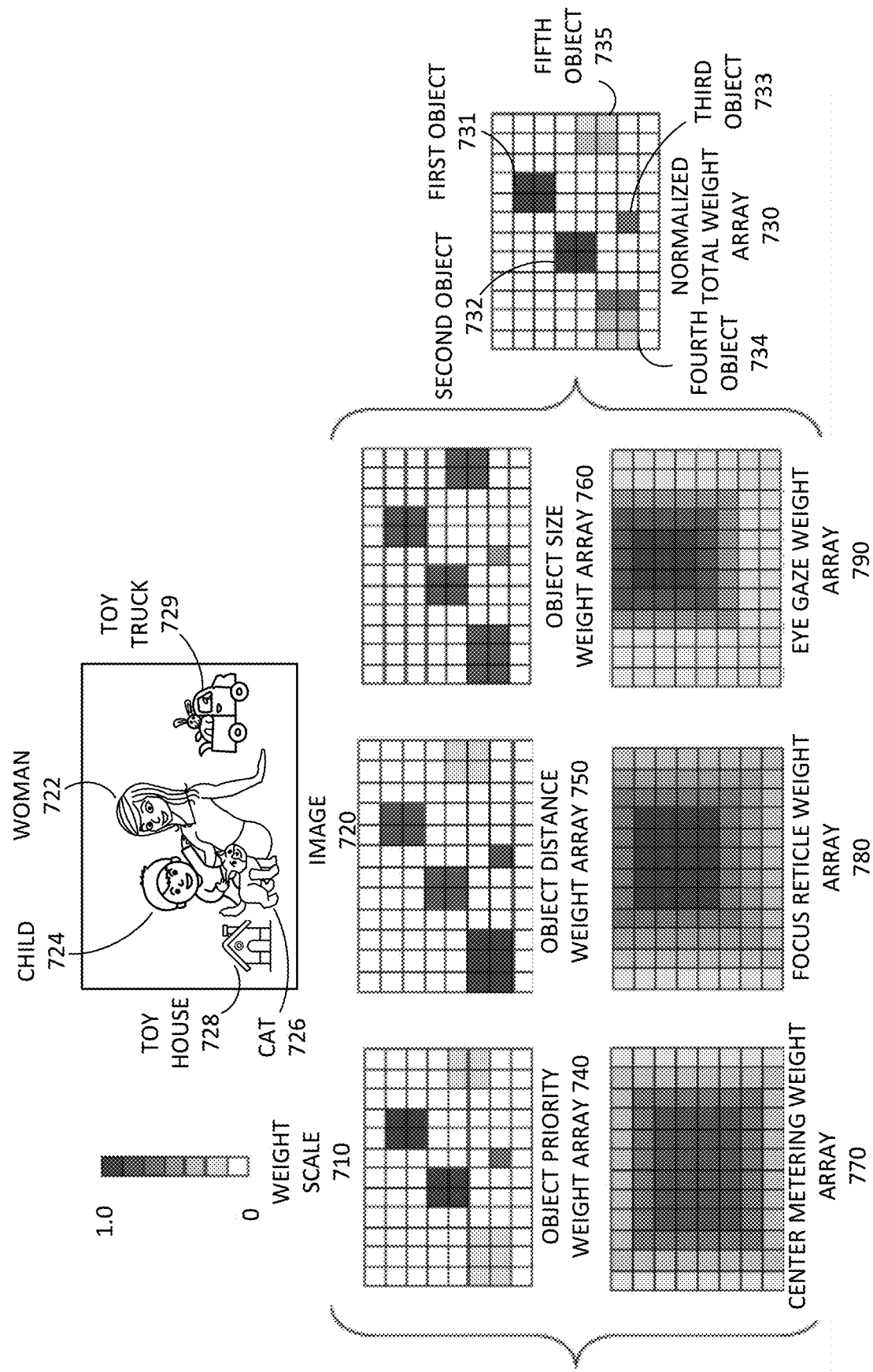
FIG. 7 illustrates an example of a normalized total weight array.

FIG. 7 illustrates an example of a normalized total weight array 730 for an image 720. Similar to above, a weight scale 710 has been provided to be a key for particular weights. In some examples, the normalized total weight array 730 may be a combination of two or more weight arrays. In such examples, the two or more weight arrays may be generated based upon any method, including the methods described above (e.g., metering, gaze, focus reticle, and the like).

In some examples, the normalized total weight array 730 may be based upon the image 720. In such examples, one or more objects (e.g., woman 722, child 724, cat 726, toy house 728, and toy truck 729) may be identified in the image 720. Based upon identifying the one or more objects, one or more weight arrays may be generated.

For example, an object priority weight array 740 (similar to the priority weight array 420) may be generated. The object priority weight array 740 may assign weights to pixel groups that include the one or more objects. In some examples, the weights may be based upon a table as described above with FIG. 3. For example, people may be associated with a higher weight than animals. Accordingly, pixel groups including the woman 722 and the child 724 may be given a weight higher than the pixel groups including the cat 726. In addition, toys may be associated with a lower weight than animals, and thus, pixel groups including the toy house 728 and the toy truck 729 may have a lower weight than the pixel groups including the cat 726. Other pixel groups that do not include an identified object may have a lower weight than the toys. For example, the illustration in FIG. 7 shows the other pixel groups to have a weight of 0; however, the weight could be non-zero.

For another example, an object distance weight array 750 may be generated using the one or more identified objects. In such an example, the object distance weight array 750 may further be based upon a depth map. The depth map may be created from an image (or a set of images) and describe a depth of each pixel. Using the depth map, an identified object may be associated with a depth. Then, objects closer to an image source (e.g., a content capture device that takes the image 720) may be assigned a higher weight.

For example, pixel groups of the toy house 728 may be given the highest weight because the toy house is the closest object. Pixel groups of the woman 722, the child 724, and the cat 726 may be assigned a similar weight that is less than the weight for the toy house 728 because these objects are about the same distance away from the image source but are farther away than the toy house 728. Similarly, pixel groups of the toy truck 729 may be assigned the smallest weight of the identified objects because the toy truck 729 is the farthest object away. In some examples, other pixel groups that do not include an object may be either assigned a weight of zero or some other non-zero weight that is less than weights assigned to pixel groups of objects.

In other examples, each pixel group may be assigned a weight regardless of whether an object is identified. In such examples, objects do not need to be identified because each weight may correspond to a value in the depth map. It should be recognized that other methods for weighing objects based upon distance may be used.

For another example, an object size weight array 760 may be generated using the one or more identified objects. While a size of an object may be computed in several different ways, one way to determine a size of an object is to count the number of pixel groups that were identified in the object size weight array 760 for the object.

In some examples, after computing the size of each identified object, the pixel groups of each identified object may be assigned a weight that is proportional to its size. For example, the toy house 728 may be given the largest weight because it is the biggest object. In one illustrative example, the woman 722, the child 724, and the toy truck 729 may all be given the same weight because they are all similar sizes. And the cat 726 may be given the smallest weight because it is the smallest. Other pixel groups not including an identified object may either be given a zero weight or a non-zero weight that is smaller than the smallest weight for an identified object.

In other examples, after computing the size of each identified object, the pixel groups of each identified object may be given a percentage of weight for each pixel group that is identified for the identified object. For example, if each pixel group is worth 0.1 weight, an object with 4 pixel groups would be 0.4 weight. In other examples, the amount of weight each pixel group is worth may be a percentage of the largest object. For example, the largest object may be given a weight of 1. And if that object is 10 pixel groups large, an object with 5 pixel groups may be given 0.5 weight. It should be recognized that other methods for weighing objects based upon size may be used.

For another example, one or more metering weight arrays may be generated, as described in FIG. 2. In one illustrative example, a center metering weight array 770 (similar to the center metering weight array 230) may be generated.

For another example, an eye gaze weight array 790 (similar to the eye gaze weight array 690) may be generated.

In some examples, the image 720 may also include information associated with a focus reticle as described with FIG. 4. The focus reticle, alone or in combination with the identified objects, may be used to generate a focus reticle weight array 780 (similar to the focus reticle weight array 530).

As described above, after the two or more weight arrays are generated, the two or more weight arrays may be combined to create the normalized total weight array 730. For example, weights for a pixel group across a plurality of weight arrays may be combined (e.g., multiplied together) to generate an updated weight for the pixel group. The normalized total weight array 730 may be combined with the average luma pixel group values to compute weighted luma pixel groups, as described above with FIG. 1. In some examples, the normalized total weight array 730 may be expressed as:

$$w_T[r, c] = \prod_{i=0}^{N_w-1} w_i[r, c]$$

where $N_w$ is the number of weight arrays. In some examples, a normalization of the total weight array may be performed such that the total weight array is scaled according to a largest weight having a value of 1 and a smallest weight having a minimum of $w_T[r,c]$ (e.g., 0). In some examples, normalization may be skipped because the weighted luma average automatically scales results by dividing by the summation of the total weight array.

Figure 8:
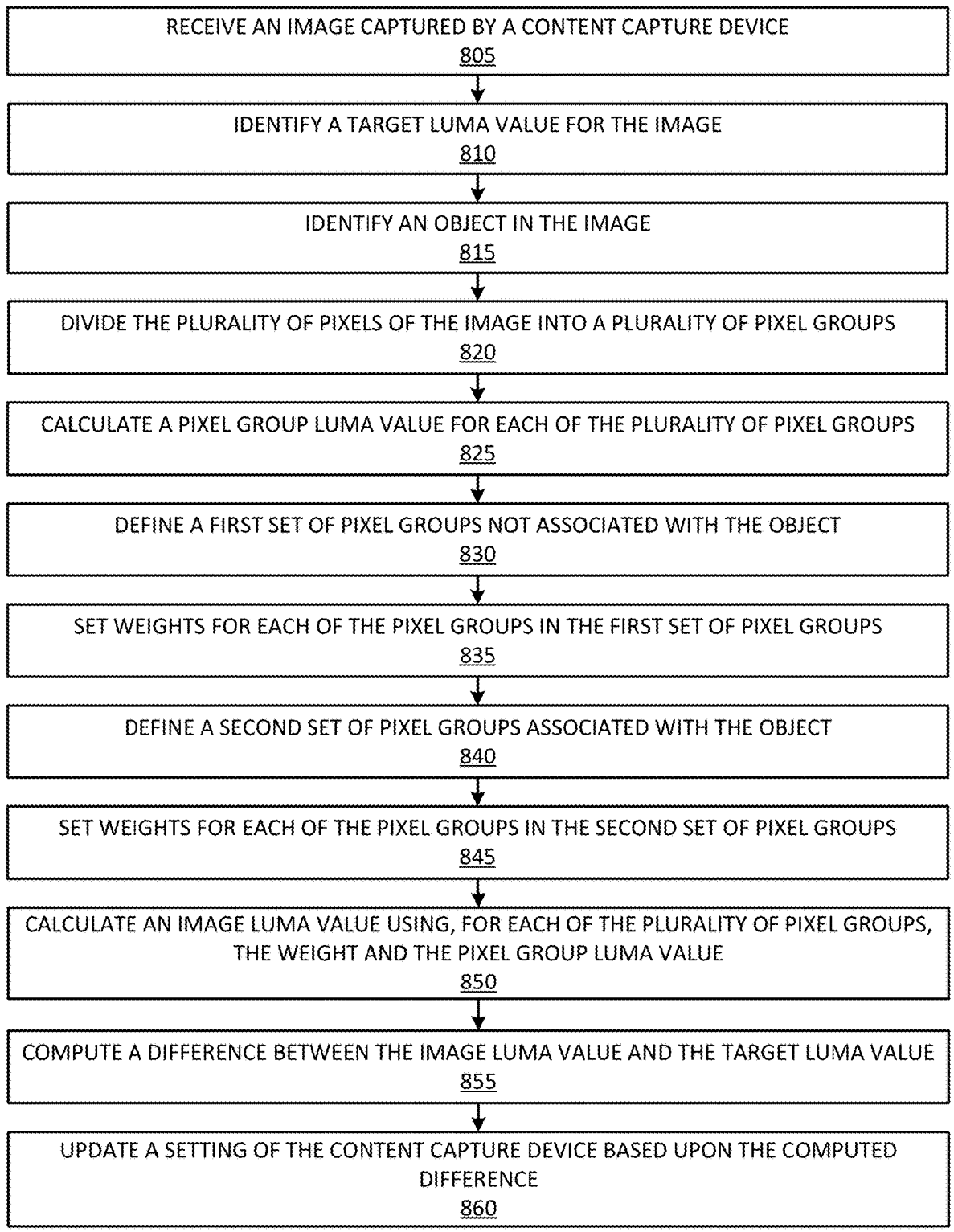
FIG. 8 is a flowchart illustrating an embodiment of a process for automatic exposure control using a first weighting model.

FIG. 8 is a flowchart illustrating an embodiment of a process for automatic exposure control using a first weighting model. In some aspects, the process 800 may be performed by a computing device.

Process 800 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

The process 800 may include receiving an image captured by a content capture device (805). In some examples, the image may include a plurality of pixels. In some examples, the image may be received from a camera or other content capture device. In other examples, the image may be received from a feed (or stream) of images. In such examples, the feed may be current or past images.

The process 800 may further include identifying a target luma value for the image (810). In some examples, the target luma value may indicate an optimal amount of luma for an image. In such examples, each pixel of the image may be associated with a luma value. In some examples, the target luma value may correspond to an average of the luma values of the image. In other examples, the target luma value may correspond to a weighted average of the luma values of the image. In other examples, the target luma value may correspond to numbers that would result from multiplying a weight array with luma values.

In some examples, the target luma value may be predefined. In other examples, the target luma value may be determined based upon one or more sensors. For one illustrative example, a sensor may detect an amount of light in an environment. Based upon the amount of light, the target luma value may be set. In such an example, there might be thresholds for the target luma value. For example, if the amount of light is above a certain amount, the target luma value may be a certain amount.

The process 800 may further include identifying an object in the image (815). In some examples, the object may be identified using an object identification system. In such examples, the object identification system may identify a type of the object (e.g., a person, an animal, a building, or the like). In other examples, the object identification system may identify one or more attributes of the object that indicate more than just a type of the object (e.g., that the object is Bill Nye). In some examples, the object identification system may identify whether the object is being processed by another system (such as a mixed reality system that is determining where to place a virtual object).

The process 800 may further include dividing the plurality of pixels of the image into a plurality of pixel groups (820). In some examples, a pixel group may represent a contiguous (or adjacent/adjoining) group of pixels. In such examples, a shape of the pixel group may vary. For example, each pixel group may be a rectangle or square such that the image is divided into rows and columns. In other examples, each pixel group may include a certain number of pixels from a center of the image. In some examples, different pixel groups may be different shapes (e.g., if a pixel group is created such that it includes an object). In some examples, pixel groups may be of different size. In some examples, a pixel group may be arranged such that two or more pixel groups are overlapping.

The process 800 may further include calculating a pixel group luma value for each of the plurality of pixel groups (825). In some examples, the pixel group luma value for a pixel group may include an average of luma values for each pixel of the pixel group. In other examples, the pixel group luma value may be a sum of the luma values for each pixel of a pixel group. In other examples, the pixel group luma value may be a difference between luma values of each pixel and an average luma value for the image. For example, an average luma value may be computed for the image, taking into account every pixel. The average luma value may then be used to compute a difference for each pixel such that a difference from the average luma value is generated for a pixel group. It should be recognized that other summary values of luma values of a pixel group may be used.

The process 800 may further include defining a first set of pixel groups not associated with the object (830). In some examples, the first set of pixel groups may include one or more other objects and/or no objects. In some examples, not being associated with the object may indicate that a pixel of one or more pixels that have been identified as the object is not included in the first set of pixel groups.

The process 800 may further include setting weights for each of the pixel groups in the first set of pixel groups (835). In some examples, the weights for each of the pixel groups in the first set of pixel groups may be based upon a table as described above with respect to FIG. 3. In other examples, the weights of each of the pixel groups in the first set of pixel groups may be automatically set to zero because the object is not included in the pixel groups. It should be recognized that other ways to determine a weight of a pixel group without the object may be used.

The process 800 may further include defining a second set of pixel groups associated with the object (840). In some examples, being associated with the object may indicate that a pixel of one or more pixels that have been identified as the object is included in the second set of pixel groups.

The process 800 may further include setting weights for each of the pixel groups in the second set of pixel groups (845). Similar to as described above, the weights for each of the pixel groups in the second set of pixel groups may be based upon a table as described above with respect to FIG. 3. In other examples, the weights of each of the pixel groups in the second set of pixel groups may be automatically set to 1 because the object is included in the pixel groups. It should be recognized that other ways to determine a weight of a pixel group with the object may be used.

The process 800 may further include calculating an image luma value using, for each of the plurality of pixel groups, the weight and the pixel group luma value (850). In some examples, calculating the image luma value may include summing each of the weighted pixel group luma values, where a weighted pixel group luma value may be computed by multiplying a weight associated with a pixel group with a luma value associated with the pixel group.

The process 800 may further include computing a difference between the image luma value and the target luma value (855), and updating a setting of the content capture device based upon the computed difference (860). In some examples, the setting may be an exposure setting or a gain setting. In such examples, the exposure setting may be a shutter speed, an ISO speed, or any combination thereof. In some examples, the shutter speed may be a global shutter or a rolling shutter. The global shutter may indicate a duration of time to expose all pixels of a field of view. The rolling shutter may indicate a duration of time to expose a row (either horizontally or vertically) of a field of view. In the rolling shutter, lines of an image may be scanned in a rolling manner rather than a snapshot of the field of view. The gain setting may be digital gain, analog gain, or any combination thereof. For example, a gain setting may be 8× by having an analog gain of 2× and a digital gain of 4×. In some examples, the exposure setting may be adjusted before the gain setting when increasing exposure. In such examples, the gain setting may be adjusted before the exposure setting when decreasing exposure. In some examples, the amount of adjustment may be proportional to the difference. For example, the adjustment may be larger if the difference between the image luma value and the target luma value is larger.

Using the weighted luma average equation described above in regards to FIG. 1, a specific weight may be disabled for the first weighting model by setting an array associated with the weight to unity.

Figure 17:
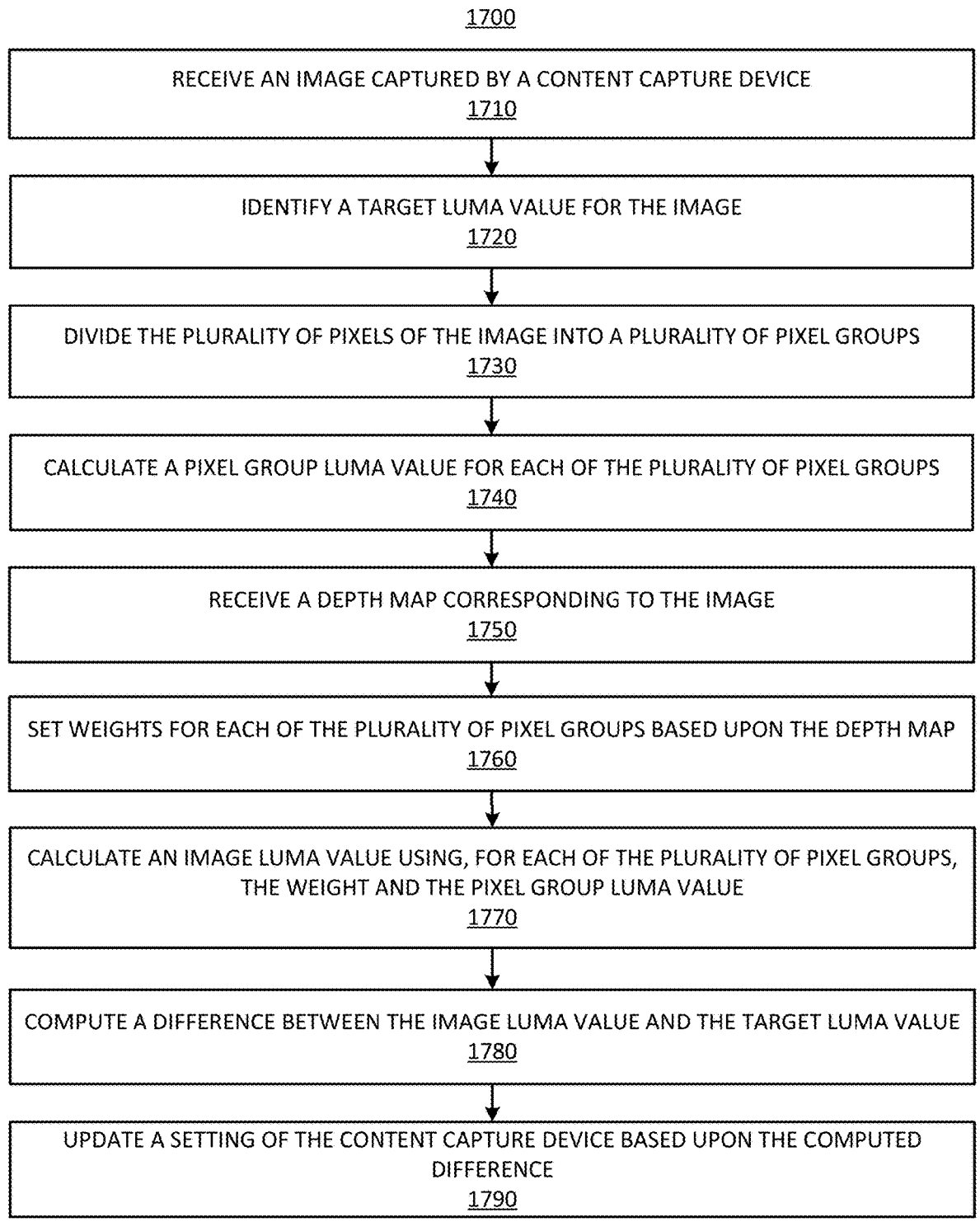
FIG. 17 is a flowchart illustrating an embodiment of a process for automatic exposure control using a depth map.

FIG. 17 is a flowchart illustrating an embodiment of a process 1700 for automatic exposure control using a depth map. The depth map may include one or more distances, where a distance is measured from a single point for each of the one or more distances. Each distance may correspond to one or more pixels in an image such that each distance indicates a distance that content included in the one or more pixels is from the single point.

In some aspects, the process 1700 may be performed by a computing device (e.g., a content capture device such as a camera). The process 1700 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

The process 1700 may include receiving an image captured by a content capture device (1710). In some examples, the image may include a plurality of pixels. In some examples, the image may be received from a camera or other content capture device. In other examples, the image may be received from a feed (or stream) of images. In such examples, the feed may be current or past images.

The process 1700 may further include identifying a target luma value for the image (1720). In some examples, the target luma value may indicate an optimal amount of luma for an image. In such examples, each pixel of the image may be associated with a luma value. In some examples, the target luma value may correspond to an average of the luma values of the image. In other examples, the target luma value may correspond to a weighted average of the luma values of the image. In other examples, the target luma value may correspond to numbers that would result from multiplying a weight array with luma values.

In some examples, the target luma value may be predefined. In other examples, the target luma value may be determined based upon one or more sensors. For one illustrative example, a sensor may detect an amount of light in an environment. Based upon the amount of light, the target luma value may be set. In such an example, there might be thresholds for the target luma value. For example, if the amount of light is above a certain amount, the target luma value may be a certain amount.

The process 1700 may further include dividing the plurality of pixels of the image into a plurality of pixel groups (1730). In some examples, a pixel group may represent a contiguous (or adjacent/adjoining) group of pixels. In such examples, a shape of the pixel group may vary. For example, each pixel group may be a rectangle or square such that the image is divided into rows and columns. In other examples, each pixel group may include a certain number of pixels from a center of the image. In some examples, different pixel groups may be different shapes (e.g., if a pixel group is created such that it includes an object). In some examples, pixel groups may be of different size. In some examples, a pixel group may be arranged such that two or more pixel groups are overlapping.

The process 1740 may further include calculating a pixel group luma value for each of the plurality of pixel groups (1740). In some examples, the pixel group luma value for a pixel group may include an average of luma values for each pixel of the pixel group. In other examples, the pixel group luma value may be a sum of the luma values for each pixel of a pixel group. In other examples, the pixel group luma value may be a difference between luma values of each pixel and an average luma value for the image. For example, an average luma value may be computed for the image, taking into account every pixel. The average luma value may then be used to compute a difference for each pixel such that a difference from the average luma value is generated for a pixel group. It should be recognized that other summary values of luma values of a pixel group may be used.

The process 1700 may further include receiving a depth map corresponding to the image (1750). As described above, the depth map may include one or more distances, where a distance is measured from a single point for each of the one or more distances. Each distance may correspond to one or more pixels in an image such that each distance indicates a distance that content included in the one or more pixels is from the single point.

In some examples, the depth map may be captured concurrently with the image capture described above. For example, whenever an image is captured for use with determining a setting for the content capture device, a depth map may also be captured. In other examples, the depth map may be captured at some point before the image is captured such that the depth map may be used to set weights for multiple images. In such examples, depths maps may be used based upon an orientation that the image was captured. For example, each of one or more depth maps may correspond to a different orientation. When an image is taken at a particular orientation, a depth map (or a portion of a depth map) corresponding to the particular orientation may be used when setting weights to be used to determining a setting for the content capture device.

Referring to FIG. 7, the depth map may indicate a distance that each of the woman 722, the child 724, the cat 726, the toy house 728, and the toy truck 729 are from a content capture device. It should be recognized that the distances might not be object based but pixel based such that a distance is for a pixel rather than an object. It should also be recognized that the depth map may indicate depths in different ways than described above.

The process 1700 may further include setting weights for each of the plurality of pixel groups based upon the depth map (1760). The weights may be set such that closer sets of one or more pixels are higher than sets of one or more pixels that are father away. In some examples, setting weights may be further based upon data indicating a location of an object from the image. For example, as illustrated in FIG. 7, the weights in the object distance weight array 750 are set such that only pixels that are identified as associated with an object are given a weight. It should be recognized that other pixels may be set as different weights that are zero or more. In some examples, the data indicating the location of the object is determined by analyzing pixels of the image to identify one or more pixels of the image that match one or more pixels of a stored image of the object. It should also be recognized that a distance weight array may be a result of setting weights, the distance weight array not based upon objects identified in an image. It should also be recognized that other methods for setting weights using a depth map be used than described above.

The process 1700 may further include calculating an image luma value using, for each of the plurality of pixel groups, the weight and the pixel group luma value (1770). In some examples, calculating the image luma value may include summing each of the weighted pixel group luma values, where a weighted pixel group luma value may be computed by multiplying a weight associated with a pixel group with a luma value associated with the pixel group.

The process 1700 may further include computing a difference between the image luma value and the target luma value (1780), and updating a setting of the content capture device based upon the computed difference (1790). In some examples, the setting may be an exposure setting or a gain setting. In such examples, the exposure setting may be a shutter speed, an ISO speed, or any combination thereof. In some examples, the shutter speed may be a global shutter or a rolling shutter. The global shutter may indicate a duration of time to expose all pixels of a field of view. The rolling shutter may indicate a duration of time to expose a row (either horizontally or vertically) of a field of view. In the rolling shutter, lines of an image may be scanned in a rolling manner rather than a snapshot of the field of view. The gain setting may be digital gain, analog gain, or any combination thereof. For example, a gain setting may be 8× by having an analog gain of 2× and a digital gain of 4×. In some examples, the exposure setting may be adjusted before the gain setting when increasing exposure. In such examples, the gain setting may be adjusted before the exposure setting when decreasing exposure. In some examples, the amount of adjustment may be proportional to the difference. For example, the adjustment may be larger if the difference between the image luma value and the target luma value is larger.

Figure 9:
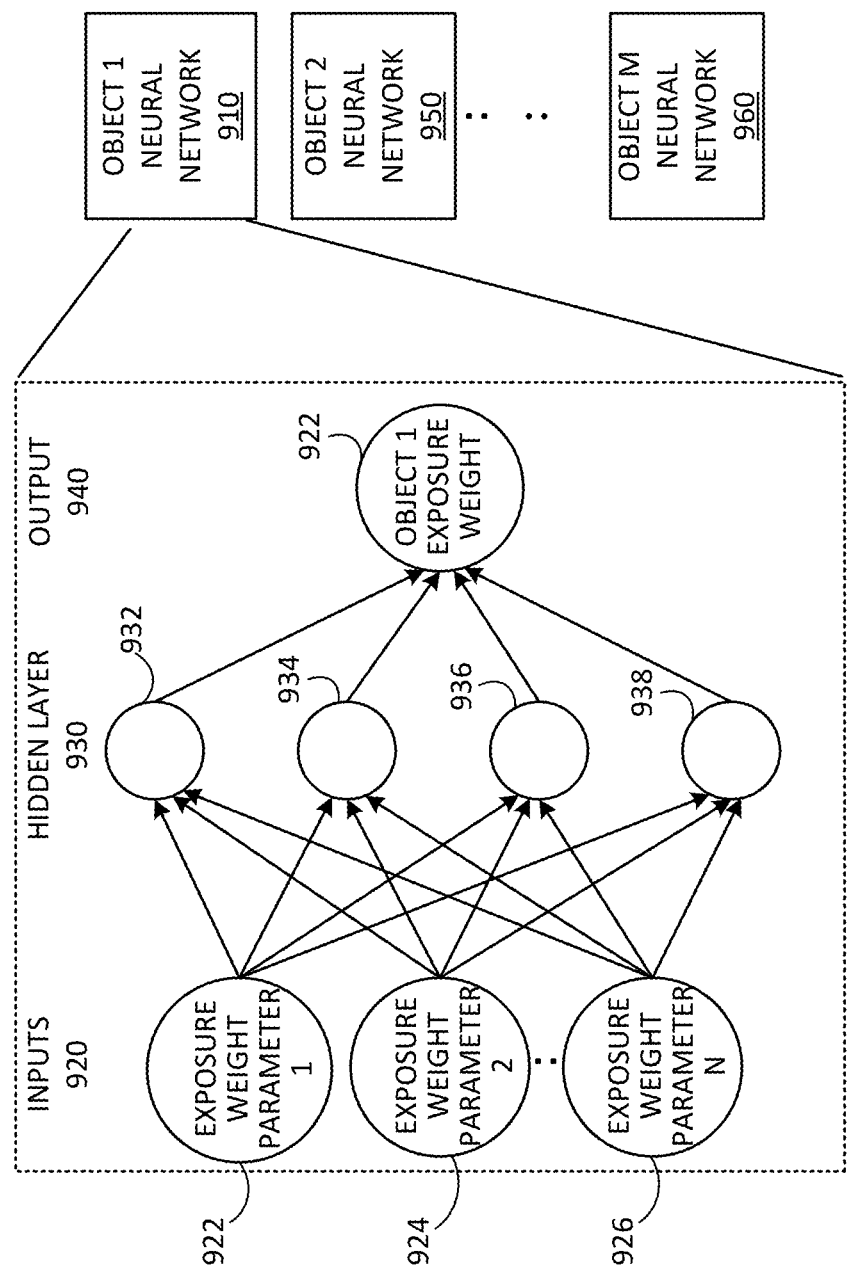
FIG. 9 illustrates an example of a first part of a second weighting model that may be used for automatic exposure control.

FIG. 9 illustrates an example of a first part of a second weighting model that is used for automatic exposure control (AEC). In some examples, the second weighting model may treat each object of an image independently of everything else in the image. In such examples, a learning based model (e.g., neural network, clustering, or the like) may be used for each object of the image (or a subset of the objects). The learning based model may output a value to be used as a weight for each pixel group for the object. After a weight is generated for each object of the image, a final weight array may be created by summing each one of the weight arrays for each object. This is different than the first weighting model, where we multiplied the weight arrays together. In other examples, a learning based model may be used for each pixel group of an object. In such examples, the rest of the process would be performed similarly to having a learning based model for each object, except rather than having a single value used for every pixel group of an object, a value would be computed for each pixel group. In other examples, a learning based model may be used for each weight (e.g., object distance, object priority, metering, or the like) for an object. In such examples, the weights for a single object would need to be combined as discussed above for the first weighting model. After the weights for each object are combined, the rest of the process may continue as the second weighting model would.

In one illustrative example, the second weighting model may utilize one or more neural networks (e.g., a multilayer perceptron) to determine a weight array. In some examples, the second weighting model may create a neural network for each of one or more identified objects in an image. In such examples, inputs to a neural network may include weights similar to those described above for weight arrays. In one illustrative example, the weights may include: Object Priority—{0.1 . . . 1}; Object Size—Small, Medium or Large {0.5, 0.75, 1}; Object Distance—Near, Mid or Far {0.5, 0.75, 1}; Metering—Edge to Center {0.9 . . . 1}; Focus Reticle—In, Near or Out {0.5, 0.75 or 1}; and Eye Gaze— "At the vector", "near the vector" or "out of the vector" {0.5, 0.75, 1}.

In the example above, the object priority weight may indicate a priority of an object. The priority of the object may be between 0 and 1. In some examples, the priority may be defined by a table as described above with respect to FIG. 3.

The object size weight may indicate a size of an object, The size of the object may be one of an enumerated set (e.g., small, medium, or large). In some examples, a size that corresponds to each one of the enumerated set may be predefined (e.g., if an object is included in three or less pixel groups, the object is small and receives a weight of 0.5; if an object is included in four to six pixel groups, the object is medium and receives a weight of 0.75; and if an object is included in six or more pixel groups, the object is large and receives a weight of 1). In other examples, the size of the object may merely be the number of pixel groups that the object is included in.

The object distance weight may indicate a distance from an image source (e.g., a content capture device). The distance of the object may be one of an enumerated set (e.g., near, mid, or far). In some examples, a distance that corresponds to each one of the enumerated set may be predefined (e.g., if an object is within 10 feet of the image source, the object is near and receives a weight of 0.5; if an object is between 10 and 50 feet of the image source, the object is mid and receives a weight of 0.75; and if an object is more than 50 feet from the image source, the object is far and receives a weight of 1). In some examples, the distance may be computed using a depth map that was generated using a depth capturing device.

The metering weight may indicate a value associated with the object from one or more metering techniques as described above. For example, if an object is near an edge of a field of view of an image, a weight value of 0.9 may be assigned. If the object is at a center of the field of view, a weight value of 1.0 may be assigned.

The focus reticle weight may indicate where the object is relative to a focus reticle. A value for the focus reticle may be one of an enumerated set (e.g., In, Near, or Out). In some examples, the values for the enumerated set may be predefined (e.g., if an object is inside of the focus reticle, the object is in and receives a weight of 0.5; if an object overlaps the focus reticle, the object is near and receives a weight of 0.75; and if an object is outside of the focus reticle, the object is out and receives a weight of 1).

The eye gaze weight may indicate where a user is looking relative to the object. A value for the eye gaze may be one of an enumerated set (e.g., "at the vector," "near the vector," or "out of the vector"). In some examples, the values for the enumerated set may be predefined (e.g., if the eye gaze is a second distance (greater than the first distance) from an object, the eye gaze is "out of the vector" and receives a weight of 0.5; if the eye gaze is a first distance away from an object, the eye gaze is "near the vector" and receives a weight of 0.75; and if the eye gaze is toward an object, the eye gaze is "at the vector" and receives a weight of 1).

Referring to FIG. 9, a first neural network for a first object (910) may be used. For the first neural network, each weight described above for the first object may be an input of inputs 920. For example, the object priority weight may be an exposure weight parameter 1 (922), the object size weight may be an exposure weight parameter 2 (924), and the eye gaze weight may be an exposure weight parameter n (926). It should be recognized that any number of weights may be used as the inputs 920.

The inputs 920 may then be passed to a hidden layer 930. While the hidden layer 930 is illustrated as one level, there may be more levels depending on the implementation of the neural network. For each level of the hidden layer 930, each value of a preceding level (which would be the inputs 920 for a first level) is multiplied by a value determined by the neural network for each node (e.g., node 932, node 934, node 936, and node 938) of the level. At each node, a function is applied to the input of the node. After the hidden layer 930 is complete, a final value is multiplied by each output, and the result is combined to create an object 1 exposure weight (922).

As may be seen in FIG. 9, a similar process as described above may be performed for each object in the image (e.g., object 2 neural network (950) and object M neural network (960)).

Figure 10:
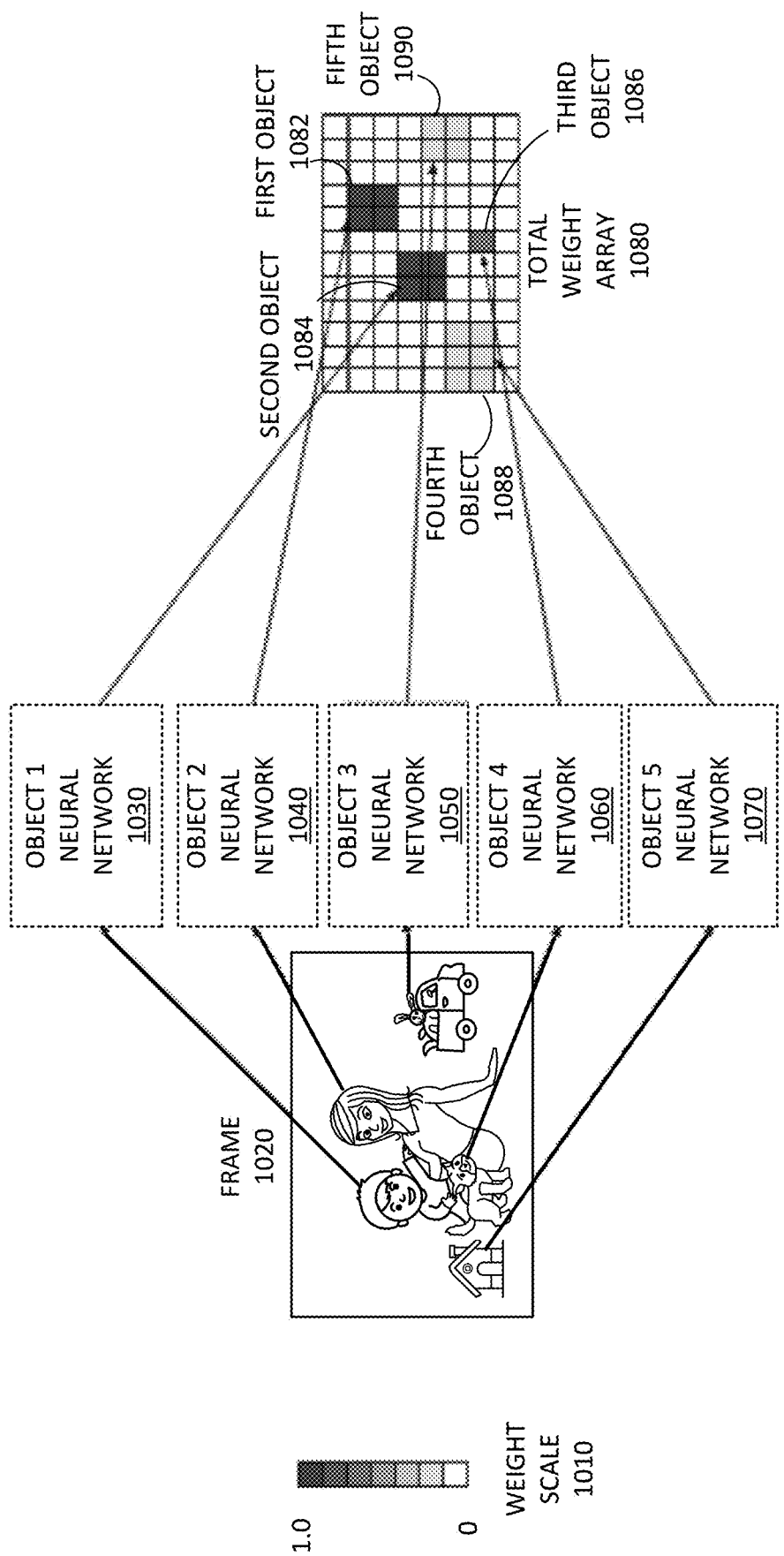
FIG. 10 illustrates an example of a second part of a second weighting model that may be used for automatic exposure control.

FIG. 10 illustrates an example of a second part of the second weighting model that may be used for automatic exposure control (AEC). The second part may illustrate what occurs after one or more neural networks are performed for each object in the image. Each of the neural networks (e.g., object 1 neural network 1030, object 2 neural network 1040, object 3 neural network 1050, object 4 neural network 1060, and object 5 neural network 1070) may output a single value (as described above). The single value may be a weight for an object associated with a neural network.

The single value may be applied to all of the pixel groups of the object (as shown in the total weight array 1080). To illustrate in an equation, a total weight array, $w_T$, may be a summation of the outputs from each object's neural network, for example:

$$w_T[r, c] = \sum_{i=0}^{N_o} w_i[r, c]$$

where $N_o$ is the number of objects.

After the total weight array 1080 is generated, the total weight array 1080 may be compared to a target as described above with reference to FIG. 1. In addition, using the weighted luma average equation described above in regards to FIG. 1, a specific weight may be disabled for the second weighting model by setting an array associated with the weight to zero.

Figure 11:
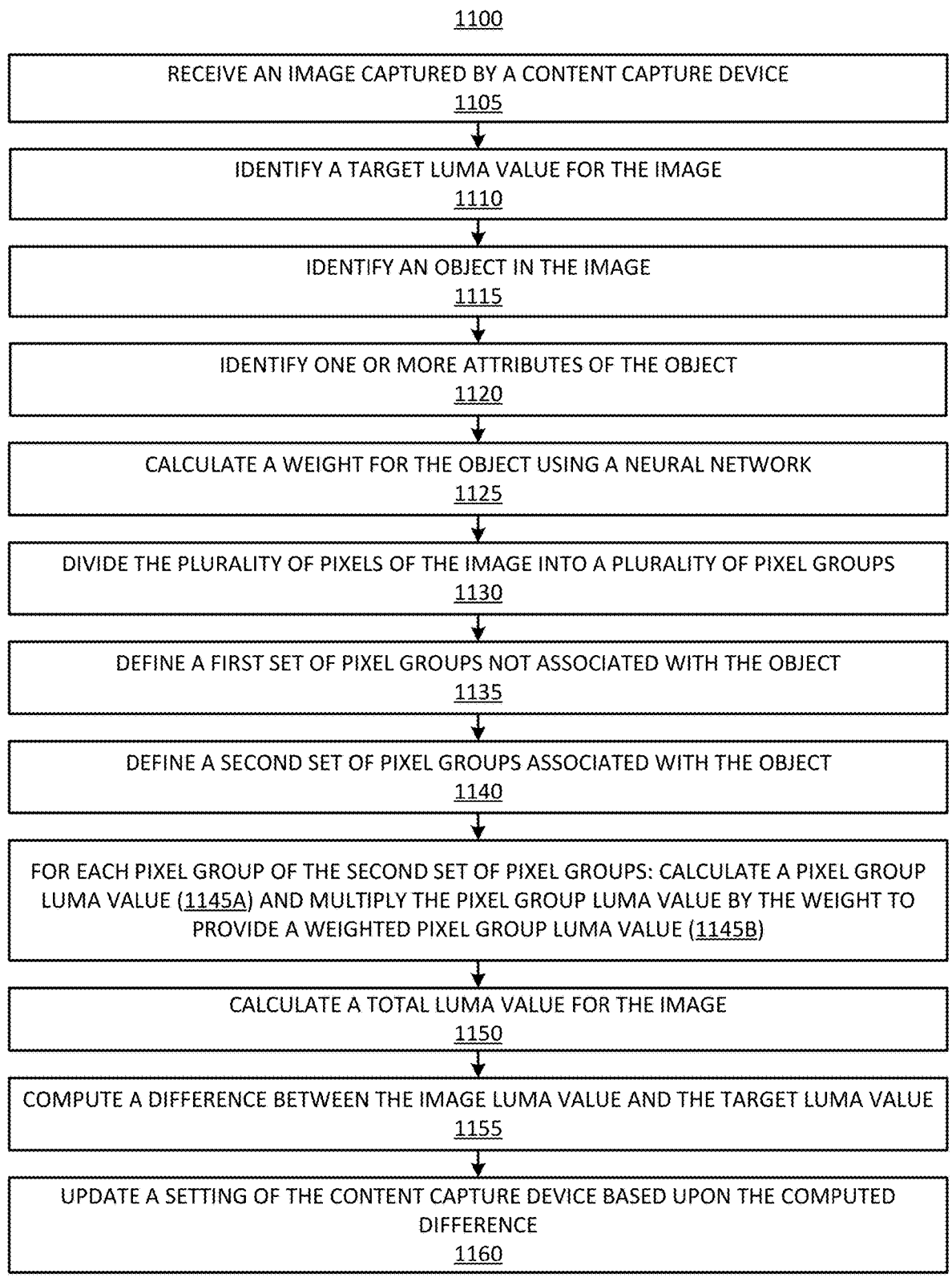
FIG. 11 is a flowchart illustrating an embodiment of a process for automatic exposure control using a second weighting model.

FIG. 11 is a flowchart illustrating an embodiment of a process 1100 for automatic exposure control (AEC) using a second weighting model. In some aspects, the process 1100 may be performed by a computing device.

Process 1100 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

The process 1100 may include receiving an image captured by a content capture device (1105). In some examples, the image may include a plurality of pixels. In some examples, the image may be received from a camera or other content capture device. In other examples, the image may be received from a feed (or stream) of images. In such examples, the feed may be current or past images.

The process 1100 may further include identifying a target luma value for the image (1110). In some examples, the target luma value may indicate an optimal amount of luma for an image. In such examples, each pixel of the image may be associated with a luma value. In some examples, the target luma value may correspond to an average of the luma values of the image. In other examples, the target luma value may correspond to a weighted average of the luma values of the image. In some examples, the target luma value may be predefined. In other examples, the target luma value may be determined based upon one or more sensors. For one illustrative example, a sensor may detect an amount of light in an environment.

The process 1100 may further include identifying an object in the image (1115). In some examples, the object may be identified using an object identification system. In such examples, the object identification system may identify a type of the object (e.g., a person, an animal, a building, or the like). In other examples, the object identification system may identify one or more attributes or characteristics of the object, more than just a type of the object (e.g., that the object is Shania Twain). In some examples, the object identification system may identify whether the object is being processed by another system (such as a mixed reality system that is determining where to place a virtual object).

The process 1100 may further include identifying one or more attributes of the object (1120). In some examples, an attribute may be associated with a weight array, such as a weight array for object priority, object size, object distance, metering, focus reticle, eye gaze, or the like (as described with reference to FIG. 9). In such examples, the attribute may be a single value that represents an average of the weights of each of the pixel groups of the object.

The process 1100 may further include calculating a weight for the object using a neural network (1125). In some examples, the neural network may use the one or more attributes as input (as described with reference to FIG. 9). In such examples, the one or more attributes may be associated with a single object. An additional neural network may be used for one or more other objects (or each of the one or more other objects). In other examples, the neural network may be associated with a plurality of objects.

The process 1100 may further include dividing the plurality of pixels of the image into a plurality of pixel groups (1130). In some examples, a pixel group may represent a contiguous (or adjacent/adjoining) group of pixels. In such examples, a shape of the pixel group may vary. For example, each pixel group may be a rectangle or square such that the image is divided into rows and columns. In other examples, each pixel group may include a certain number of pixels from a center of the image. In some examples, different pixel groups may be different shapes (e.g., if a pixel group is created such that it includes an object). In some examples, pixel groups may be of different size.

The process 1100 may further include defining a first set of pixel groups not associated with the object (1135). In some examples, the first set of pixel groups may include one or more other objects and/or no objects. In some examples, not being associated with the object may indicate that a pixel of one or more pixels that have been identified as the object is not included in the first set of pixel groups.

The process 1100 may further include defining a second set of pixel groups associated with the object (1140). In some examples, being associated with the object may indicate that a pixel of one or more pixels that have been identified as the object is included in the second set of pixel groups.

The process 1100 may further include calculating a pixel group luma value for each pixel group of the second set of pixel groups (1145A). In some examples, the pixel group luma value for a pixel group may include an average of luma values for each pixel of the pixel group. In other examples, the pixel group luma value may be a sum of the luma values for each pixel of a pixel group. In other examples, the pixel group luma value may be a difference between luma values of each pixel and an average luma value for the image. For example, an average luma value may be computed for the frame, taking into account every pixel. The average luma value may then be used to compute a difference for each pixel such that a difference from the average luma value is generated for a pixel group. It should be recognized that other summary values of luma values of a pixel group may be used.

In addition, the process 1100 may further include multiplying the pixel group luma value by the weight to provide a weighted pixel group luma value for each pixel group of the second set of pixel groups (1145B). In some examples, the weight may be the same for each pixel group associated with the object.

The process 1100 may further include calculating a total luma value for the image (1150). In some examples, the total luma value may include a summation of the weighted pixel group luma values. In some examples, calculating the image luma value may include summing each of the weighted pixel group luma values, where a weighted pixel group luma value may be computed by multiplying a weight associated with a pixel group with a luma value associated with the pixel group.

The process 1100 may further include computing a difference between the total luma value and the target luma value (1155), and updating a setting of the content capture device based upon the computed difference (1160). In some examples, the setting may be an exposure setting or a gain setting. In such examples, the exposure setting may be a shutter speed, an ISO speed, or any combination thereof. In some examples, the shutter speed may be a global shutter or a rolling shutter. The global shutter may indicate a duration of time to expose all pixels of a field of view. The rolling shutter may indicate a duration of time to expose a row (either horizontally or vertically) of a field of view. In the rolling shutter, lines of an image may be scanned in a rolling manner rather than a snapshot of the field of view. The gain setting may be digital gain, analog gain, or any combination thereof. For example, a gain setting may be 8× by having an analog gain of 2× and a digital gain of 4×. In some examples, the exposure setting may be adjusted before the gain setting when increasing exposure. In such examples, the gain setting may be adjusted before the exposure setting when decreasing exposure. In some examples, the amount of adjustment may be proportional to the difference. For example, the adjustment may be larger if the difference between the image luma value and the target luma value is larger.

Figure 18:
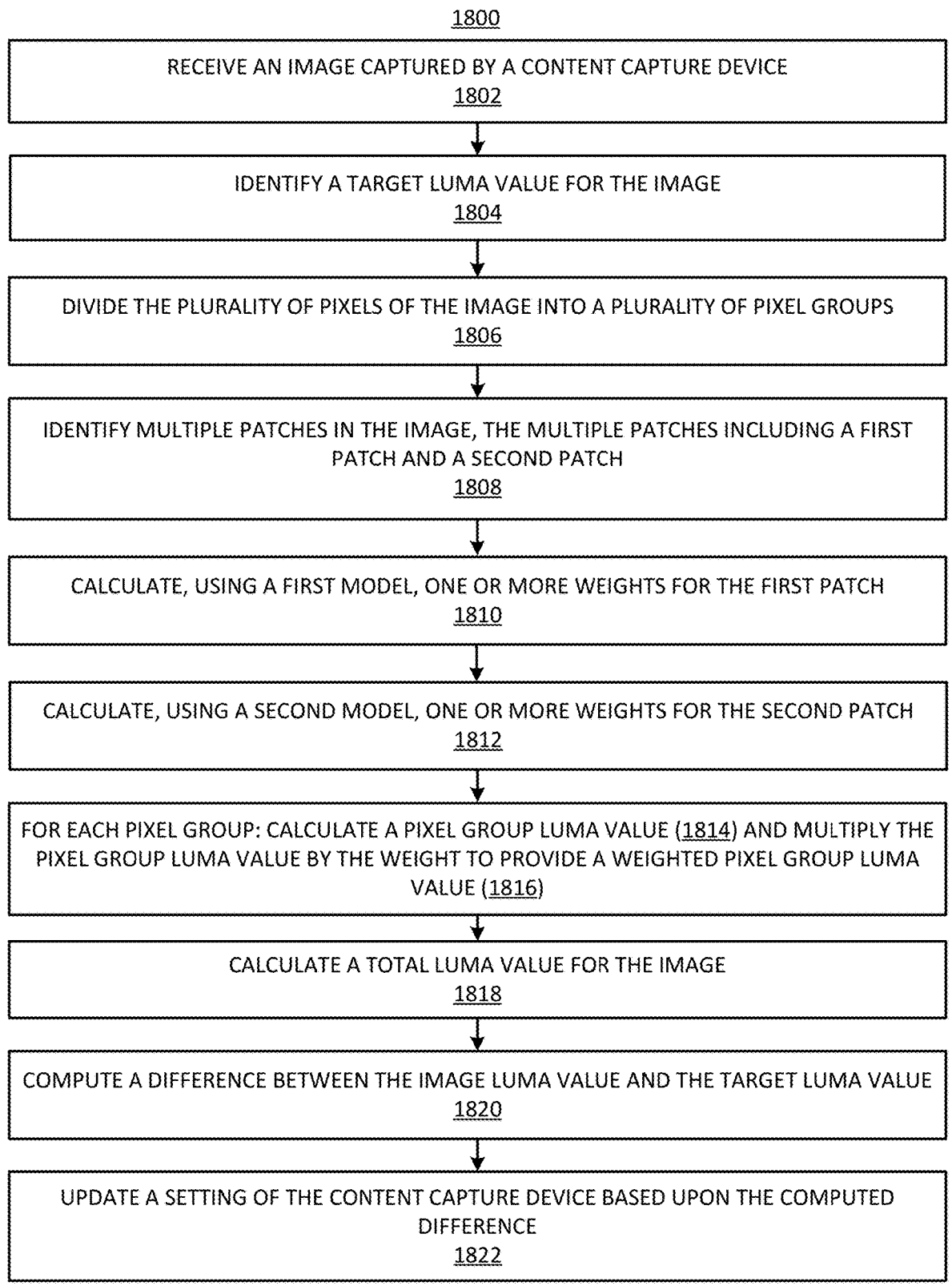
FIG. 18 is a flowchart illustrating an embodiment of a process for automatic exposure control using multiple models.

FIG. 18 is a flowchart illustrating an embodiment of a process 1800 for automatic exposure control using multiple models. When using multiple models, two or more of the multiple models may be the same or different types of models. For example, multiple neural networks (as described above in FIGS. 9-11) may be used. When multiple models are used (according to this figure), each of the multiple models may provide weights for a particular portion of an image such that weights associated with each of multiple models do not overlap.

In some aspects, the process 1800 may be performed by a computing device. The process 1800 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

The process 1800 may include receiving an image captured by a content capture device (1802). In some examples, the image may include a plurality of pixels. In some examples, the image may be received from a camera or other content capture device. In other examples, the image may be received from a feed (or stream) of images. In such examples, the feed may be images that are either recently taken or stored.

The process 1800 may further include identifying a target luma value for the image (1804). In some examples, the target luma value may indicate an optimal amount of luma for an image. In such examples, each pixel of the image may be associated with a luma value. In some examples, the target luma value may correspond to an average of the luma values of the image. In other examples, the target luma value may correspond to a weighted average of the luma values of the image. In some examples, the target luma value may be predefined. In other examples, the target luma value may be determined based upon one or more sensors. For one illustrative example, a sensor may detect an amount of light in an environment.

The process 1800 may further include dividing the plurality of pixels of the image into a plurality of pixel groups (1806). In some examples, a pixel group may represent a contiguous (or adjacent/adjoining) group of pixels. In such examples, a shape of the pixel group may vary. For example, each pixel group may be a rectangle or square such that the image is divided into rows and columns. In other examples, each pixel group may include a certain number of pixels from a center of the image. In some examples, different pixel groups may be different shapes (e.g., if a pixel group is created such that it includes an object). In some examples, pixel groups may be of different size.

The process 1800 may further include identifying multiple patches in the image (1808). The multiple patches may include a first patch and a second patch. Each patch may include one or more pixel groups. In some examples, some patches may include more or less pixel groups than other patches. In some examples, a patch may be identified based upon content of the image. For example, one or more objects may be identified in the image, where each patch includes pixels of a different object. In other examples, each patch may be a set of one or more pixels, each set being used no matter what image is received. It should be recognized that other methods for identifying patches may be used.

The process 1800 may further include calculating one or more weights for the first patch (1810). The one or more weights for the first patch may be calculated using a first model. The first model may be any model described herein, such as an object priority weight array, object size weight array, object distance weight array, metering weight array, focus reticle weight array, eye gaze weight array, a neural network that is based upon content included in the first patch, or the like.

The process 1800 may further include calculating one or more weights for the second patch (1812). The one or more weights for the second patch may be calculated using a second model, which may be the same or different model as the first model. It should be recognized that more than two models may be used. It should also be recognized that certain patches may use the same model while other patches in the same image may use different models. In such cases, patches that are determined to have one or more particular characteristics in common may end up using the same model.

The process 1800 may further include calculating a pixel group luma value for each pixel group of the second set of pixel groups (1814). In some examples, the pixel group luma value for a pixel group may include an average of luma values for each pixel of the pixel group. In other examples, the pixel group luma value may be a sum of the luma values for each pixel of a pixel group. In other examples, the pixel group luma value may be a difference between luma values of each pixel and an average luma value for the image. For example, an average luma value may be computed for the frame, taking into account every pixel. The average luma value may then be used to compute a difference for each pixel such that a difference from the average luma value is generated for a pixel group. It should be recognized that other summary values of luma values of a pixel group may be used.

In addition, the process 1800 may further include, for each pixel group of the second set of pixel groups, multiplying the pixel group luma value for the pixel group by the weight for the pixel group to provide a weighted pixel group luma value (1816). In some examples, the weight may be the same for each pixel group associated with the object.

The process 1800 may further include calculating a total luma value for the image (1818). In some examples, the total luma value may include a summation of the weighted pixel group luma values. In some examples, calculating the image luma value may include summing each of the weighted pixel group luma values, where a weighted pixel group luma value may be computed by multiplying a weight associated with a pixel group with a luma value associated with the pixel group.

The process 1800 may further include computing a difference between the total luma value and the target luma value (1820), and updating a setting of the content capture device based upon the computed difference (1822). In some examples, the setting may be an exposure setting or a gain setting. In such examples, the exposure setting may be a shutter speed, an ISO speed, or any combination thereof. In some examples, the shutter speed may be a global shutter or a rolling shutter. The global shutter may indicate a duration of time to expose all pixels of a field of view. The rolling shutter may indicate a duration of time to expose a row (either horizontally or vertically) of a field of view. In the rolling shutter, lines of an image may be scanned in a rolling manner rather than a snapshot of the field of view. The gain setting may be digital gain, analog gain, or any combination thereof. For example, a gain setting may be 8× by having an analog gain of 2× and a digital gain of 4×. In some examples, the exposure setting may be adjusted before the gain setting when increasing exposure. In such examples, the gain setting may be adjusted before the exposure setting when decreasing exposure. In some examples, the amount of adjustment may be proportional to the difference. For example, the adjustment may be larger if the difference between the image luma value and the target luma value is larger.

Figure 12A:
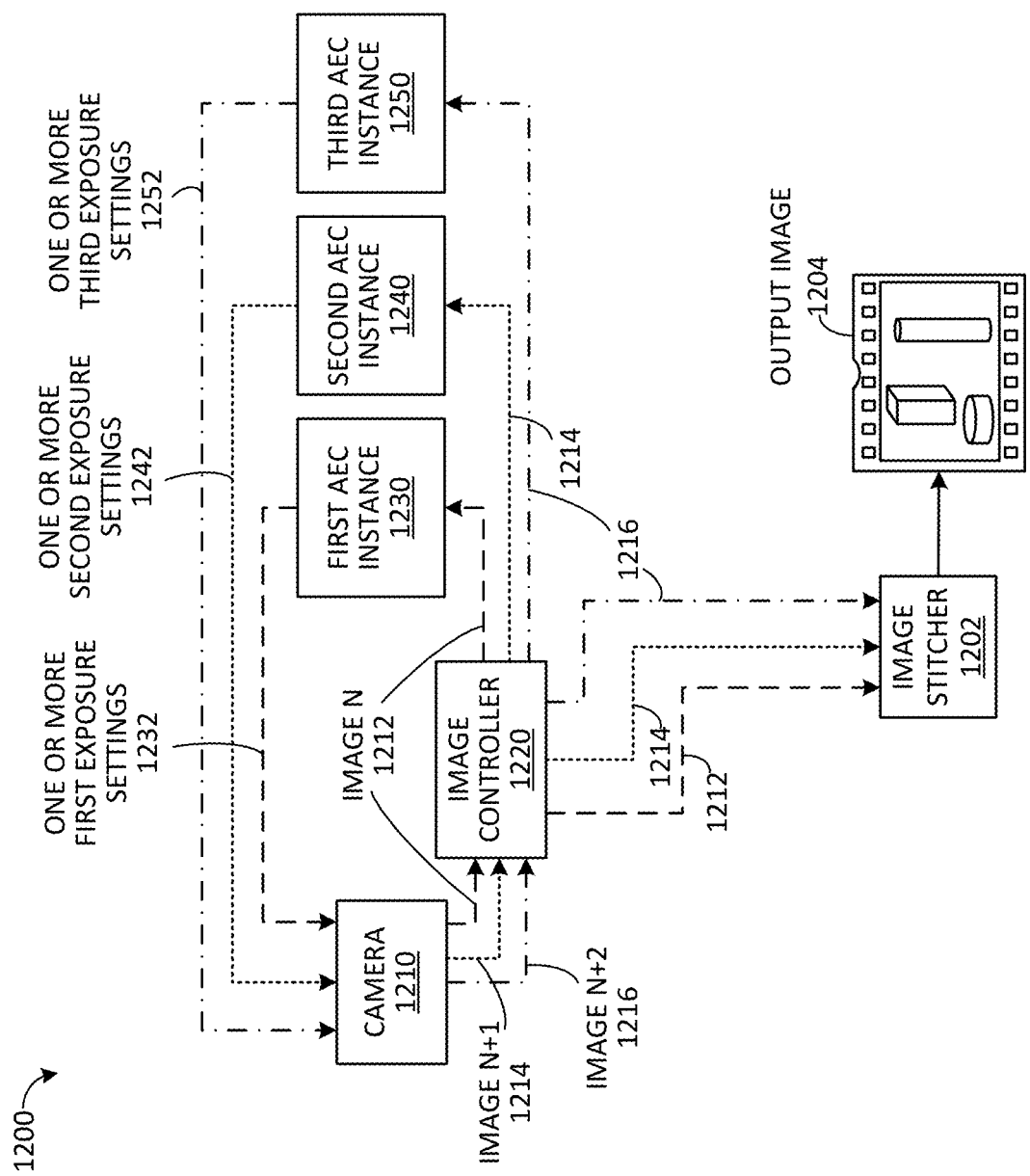
FIG. 12A illustrates an example of an image stitching process that may use multiple instances of automatic exposure control.

FIG. 12A illustrates an image stitching process 1200. In some examples, the image stitching process 1200 may include multiple instances of automatic exposure control (AEC), each instance adjusting the same or different one or more settings. And because AEC instances are used, any weighting model may be used, including the first and second weighting models discussed above. In some examples, the image stitching process 1200 may create an output image 1204 that combines two or more images. In such examples, the image stitching process 1200 may combine images that were captured based upon adjustments from each of the multiple instances of AEC. For example, after one or more settings are set due to an instance of an AEC, an image may be captured that is combined with other images that were also captured after one or more settings were set due to other instances of an AEC.

In some examples, a content capture device 1210 may be configured in a high dynamic range (HDR) mode. The HDR mode may facilitate capturing multiple images of a similar scene and stitching the multiple images together. In such examples, the HDR mode may include an ability to have one or more settings changed for particular images. In a traditional HDR mode, software and/or hardware associated with a content capture device may programmed to automatically adjust an exposure value (e.g., a number that represents a combination of a content capture device's shutter speed and f-number, sometimes abbreviated as EV) for a sequence of 3 or 5 frames by +/−1 EV or +/−1 EV and +/−3 EV. In some examples, EV may be an exposure step of a predetermined sized. For example, a 3-frame HDR mode may adjust the EV to −1 for a first frame, 0 for a second frame, and +1 for a third frame. In such examples, the traditional HDR mode may blindly adjust exposure by a fixed amount in an attempt to increase contrast in an image. The object-based exposure methods described herein are able to provide proper settings for a number of objects in the image. For example, a 3-frame HDR mode may adjust the EV for a first object for a first frame, for a second object in a second frame, and for the remaining objects in a third frame.

In some examples, an AEC instance may be associated with one or more objects of an image. In such examples, the AEC instance may determine to update one or more settings of a content capture device 1210 for the one or more objects. In some examples, each instance of AEC may be associated with a different image and different one or more objects such that an update from an instance would be customized for one or more objects of the instance. In such examples, images captured using different updates (each update for a different one or more objects) may be combined to create an image that is individually and separately customized for different objects.

In some examples, the image stitching process 1200 may include receiving three images (e.g., image n (1212), image n+1 (1214), and image n+2 (1216)) from the content capture device 1210. The three images may be received at once or sequentially. In addition, it should be recognized that more or less than three images may be received.

In some examples, the three images may be received by an image controller 1220. The image controller 1220 may determine which AEC instance to send an image. In some examples, the image controller 1220 may send images to AEC instances in a loop as images are received. For example, a loop may cause a first image (e.g., image n (1212)) to be sent to a first AEC instance 1230, a second image (e.g., image n+1 (1214)) to be sent to a second AEC instance 1240, and a third image (e.g., image n+2 (1216)) to be sent to a third AEC instance 1250. Using an order of the loop, a fourth image may be sent to the first AEC instance 1230 (similar to the first image), a fifth image may be sent to the second AEC instance 1240 (similar to the second image), and a sixth image may be sent to the third AEC instance 1250 (similar to the third image).

It should be recognized that objects in an image may be divided into larger or smaller groups such that more or less images are included in one complete loop. For example, a loop of size two would cause a third image to be sent to a first AEC instance rather than a third AEC instance. In some examples, the images of the image stitching process 1200 may be associated with approximately the same scene such that the images may be easily combined together.

In some examples, the first AEC instance 1230 may determine one or more first settings 1232 (e.g., an exposure setting, a gain setting, or any combination thereof) for one or more first objects from the first image. The one or more first settings 1232 may be sent to the content capture device 1210 to be used for a future image. In some examples, the future image may be the next image. In other examples, the future image may be based upon a number of the AEC instances. For example, if there are three AEC instances, the future image may be three images in the future.

In some examples, the second AEC instance 1240 may determine one or more second settings 1242 (e.g., an exposure setting, a gain setting, or any combination thereof) for one or more second objects from the second image. In such examples, the second image may be captured before or after the first image. The one or more second settings 1242 may be sent to the content capture device 1210 to be used for a future image, similar to as described above for the first AEC instance.

In some examples, the third AEC instance 1250 may determine one or more third settings 1252 (e.g., an exposure setting, a gain setting, or any combination thereof) for one or more third objects from the third image. In such examples, the third image may be captured before or after the second image. The one or more third settings 1252 may be sent to the content capture device 1210 to be used for a future image, similar to as described above for the first AEC instance.

In some examples, after the adjustments to the content capture device 1210 from the AEC instances, the content capture device 1210 may continue to capture images to be sent to the image controller 1220. In such examples, as the adjustments are made, the new images may be optimized for particular objects, thereby incrementally improving exposure for images.

In some examples, the image controller 1220 may also send the images to an image stitcher 1202. The image stitcher 1202 may combine the images based upon the identified objects. For example, the image stitcher 1202 may receive a first image that had been optimized for one or more first objects, a second image that had been optimized for one or more second objects, and a third image that had been optimized for other portions not included in the first and second objects and/or the third image as a whole. In such an example, the image stitcher 1202 may use portions of the first image that are associated with the one or more first objects, portions of the second image that are associated with the one or more second objects, and portions of the third to create the output image 1204.

In some examples, the image stitcher 1202 may wait before stitching images together for a number of images that corresponds to a number of AEC instances. For example, if there are three AEC instances, the image stitcher 1202 may wait until it receives three images before combining (or stitching) the images.

In some examples, the image stitcher 1202 may be aware of the identified objects and their relative priorities. In such examples, the image stitcher 1202 may generate the output image 1204 based upon the identified objects and their relative priorities. For example, the image stitcher 1202 may generate lower priority portions first, and then generate higher priority portions on top of the lower priority portions. In other words, images adjusted for higher priority objects are overlaid on top of images adjusted for lower priority objects. In some examples, the image stitcher 1202 may produce an image. In such examples, the image stitcher 1202 may be programmed to operate on the 3 images with the assigned priorities. As AEC settles for each of the 3 images, the image stitcher 1202 may produce a progressively better stitched image. The stitched image may be used in a variety of ways, including to display to a user (e.g., in a viewfinder of the content capture device or on a remote display), as input to an object identification system such that objects are identified in the stitched image rather than an unoptimized image, or to store in memory (local or remote from the content capture device) for later use.

According to an embodiment of the present invention, a method is provided. The method includes receiving a first image captured by a content capture device, identifying a first object in the first image, and determining a first update to a first setting of the content capture device, wherein the first update is determined for the first object. The method also includes receiving a second image captured by the content capture device, wherein the second image is captured after the first image, identifying a second object in the second image, and determining a second update to a second setting of the content capture device, wherein the second update is determined for the second object. The method further includes performing the first update to the first setting of the content capture device, receiving a third image captured by the content capture device, wherein the third image is captured after the first update is performed, and performing the second update to the second setting of the content capture device. The method additionally includes receiving a fourth image captured by the content capture device, wherein the fourth image is captured after the second update is performed and combining the third image and the fourth image into a single image.

As an example, the first setting and the second setting can be associated with exposure or gain. The first setting can be the second setting. Moreover, the third image and the fourth image can be combined using an image stitcher. The first update can be determined using a neural network. In an embodiment, the first update is different than the second update. For instance, the first image and the second image can have the same field of view.

Figure 12B:
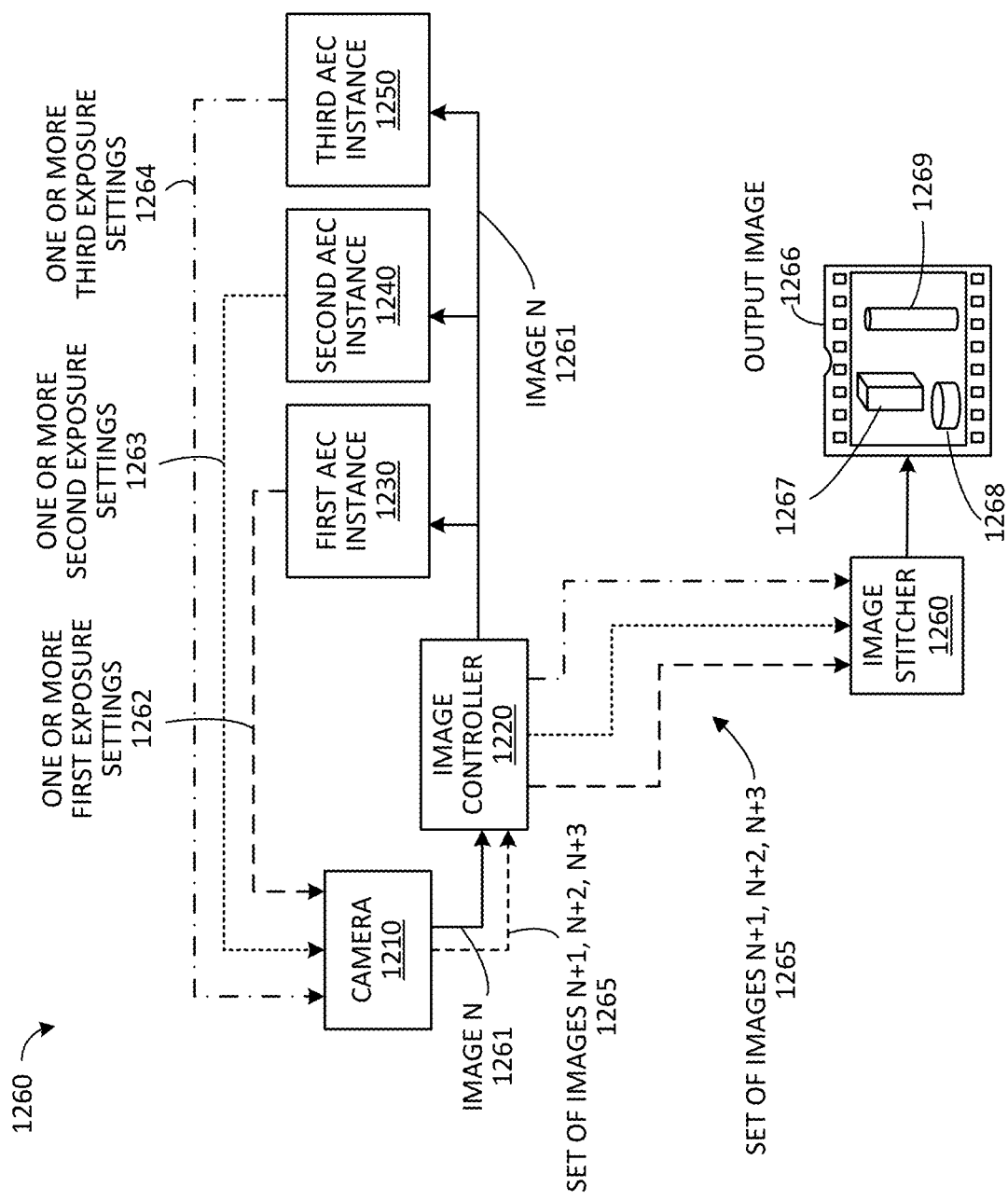
FIG. 12B illustrates another example of an image stitching process that may use multiple instances of automatic exposure control.

FIG. 12B illustrates another example of an image stitching process that may use multiple instances of automatic exposure control. The process illustrated in FIG. 12B shares some similarities with that illustrated in FIG. 12A and description provided in relation to FIG. 12A is applicable to FIG. 12B as appropriate. Referring to FIG. 12B, a content capture device 1210 (referenced as camera in FIG. 12B for purposes of clarity) is used to capture a first image (Image N 1261).

The image N 1261 is provided to image controller 1220. The image controller 1220 identifies up to a predetermined number of priority objects in the image N, wherein the predetermined number is greater than or equal to two. As an example, 2-5 priority objects can be identified in an embodiment. The example illustrated in FIG. 12B uses three priority objects 1267, 1268, and 1269 in composite image 1266. Image 1266 may have 3 priority objects because 1) that is the maximum allowed (i.e. the predetermined number of priority objects is 3-even if more than 3 potential priority objects were identified, only the top 3 options were chosen), or 2) only 3 objects were identified in the image that could be considered priority objects even though the maximum was not reached (for example, the predetermined number of priority objects was 5), or 3) the system will always return the predetermined number of priority objects regardless of what is contained in the scene (i.e. the system will force a selection of 3). Although three priority objects are illustrated in FIG. 12B, it will be evident to one of skill in the art that a smaller number (e.g., 2) or a greater number, (e.g., 4 or more) can be utilized in embodiments of the present invention. In some examples, a set of priority objects are selected for use from a larger set of priority objects identified in the first image. To reduce system complexity and computational burden, the number of priority objects may be limited to a given number, for example, a maximum of five priority objects.

The image controller 1220 sends the image to multiple AEC instances 1230, 1240, and 1250, where the number of AEC instances is equal to the number of priority objects identified. In some examples, the image controller 1220 may send the image N to N AEC instances concurrently in a serial manner.

The AEC instances are used to determine, for each of the predetermined number of priority objects, updates for one or more settings of the content capture device. As illustrated in FIG. 12B, the image N 1261 can be analyzed using the three different AEC instances 1230, 1240, and 1250 to determine the updates for the one or more settings, with each of the updates customized to one of the priority objects. Accordingly, the AEC instances are used to determine settings for the content capture device, with each AEC instance performing functions that are customized to one of the particular priority objects. The settings may be an exposure setting, a gain setting, or any combination thereof.

An iterative process is then performed with the number of iterations being equal to the predetermined number. As illustrated in FIG. 12B, a set of images N+1, N+2, and N+3 are captured as the content capture device is updated using each of the predetermined number of updates (i.e., three updates). The first image is customized to the first priority object, providing optimized exposure settings for the first priority object in an embodiment. In an iterative manner, the content capture device is updated using the next update for one or more settings of the content capture device and a next image is acquired. This process continues for each of the updates until the predetermined number of images have been captured. Thus, in FIG. 12B, each of the set of images N+1, N+2, N+3 are captured using one or more settings customized (e.g., optimized) to the respective priority objects 1267, 1268, and 1269. Of course, more than three settings and images can be captured.

As will be evident to one of skill in the art, each of the set of images 1265 will include a portion that is associated with each of the predetermined number of priority objects. As an example, image N+1 could be associated with priority object 1267, image N+2 could be associated with priority object 1268, and image N+3 could be associated with priority object 1269. The set of images, each captured using settings customized (e.g., optimized) to a particular priority object, are provided to image stitcher 1260. The image stitcher 1260 is used to stitch the predetermined number of images (i.e., the set of images 1265) together into a composite image 1266. As illustrated in FIG. 12B, the set of images 1265 can be used to extract the portion of each image that is associated with one of the priority objects and these portions can then be stitched together to form composite image 1266 that combines the portions into a single image. Since one portion of each of the set of images is optimized for one of the priority objects, the single image will include optimized images of each priority object. The composite image can then be displayed to the user.

Moreover, in some implementations, the functionality of the image controller 1220 and the image stitcher 1260 can be combined in a single master image processing unit.

Figure 12C:
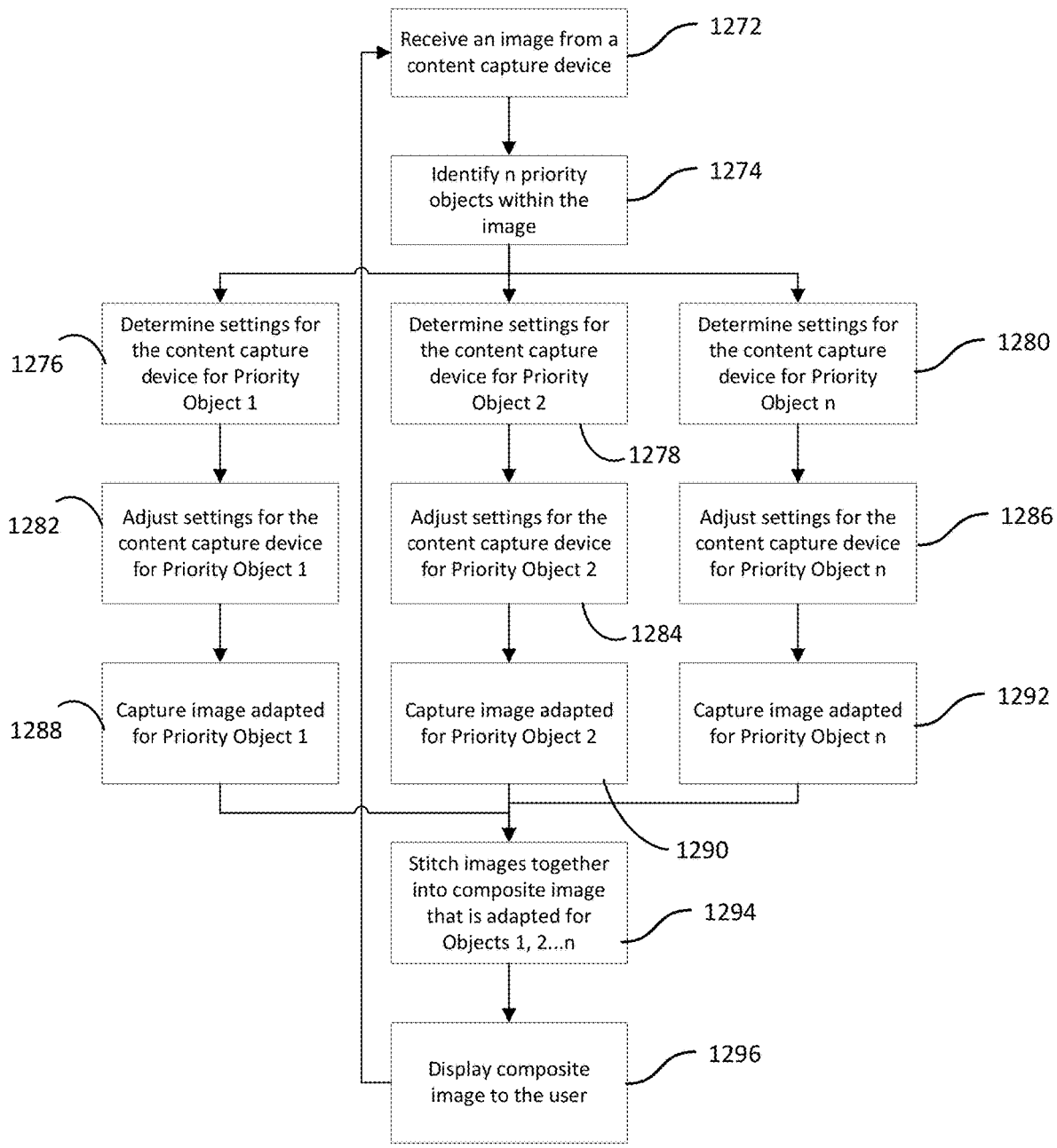
FIG. 12C is a flowchart illustrating an embodiment of a process for using multiple instances of automatic exposure control.

FIG. 12C is a flowchart illustrating an embodiment of a process for using multiple instances of automatic exposure control. The method 1270 includes receiving an image from a content capture device (1272) and identifying a predetermined number (n) of priority objects within the image (1274). In an embodiment, the identified priority objects can be the top n priority objects within the image. Although three priority objects are illustrated in FIG. 12B, embodiments of the present invention are not limited to three and n can be larger than or less than three. The method also includes determining settings of the content capture device for priority object 1 (1276), determining settings of the content capture device for priority object 2 (1278), and determining settings of the content capture device for priority object n (1280). As an example, the settings, also referred to as one or more settings, can be optimized settings in the sense that they provide the exposure values that result in desirable (e.g., best) exposure of the priority object of interest. As illustrated in FIG. 12B, the AEC instances 1230, 1240, and 1250 can be utilized to provide these settings, which can include an exposure setting, a gain setting, or any combination thereof.

The one or more first settings may be sent to the content capture device in order to adjust the settings. Accordingly, the settings for the content capture device are adjusted for priority object 1 (1282), priority object 2 (1284), and priority object 3 (1286). Using the set of updated settings, a set of images are captured using the content capture device. An image that is adapted for priority object 1 is captured (1288), an image that is adapted for priority object 2 is captured (1290), and an image that is adapted for priority object 3 is captured (1292). Because these new images are optimized for particular priority objects, the exposure for each of these images is improved with relation to each priority object.

The method also includes stitching portions of the set of images together to form a composite image that is adapted for priority objects 1 through n 1294. Thus, the image stitcher 1202 illustrated in FIG. 12B may use a portion of the first image that is associated with the first priority object, a portion of the second image that is associated with the second priority object, and a portion of the third that is associated with the third priority object to create the single image 1266. The description related to image stitching in FIG. 12A is applicable to the method described in relation to FIG. 12C as appropriate.

Thus, using a single image received at block 1272 that includes multiple priority objects, one or more AEC instances can be used to determine updated (e.g., optimized) settings that are specific to each of the priority objects identified in the single image. Then, using the updated settings, a set of images can be captured, with each image in the set being customized (e.g., optimized) for each of the priority objects. Stitching together portions of each image in the set, where the portions are associated with one of the priority object, enables the production of a stitched image that can be displayed to the user 1296 in which the exposure settings vary throughout the composite image and are customized to the priority objects.

Figure 13:
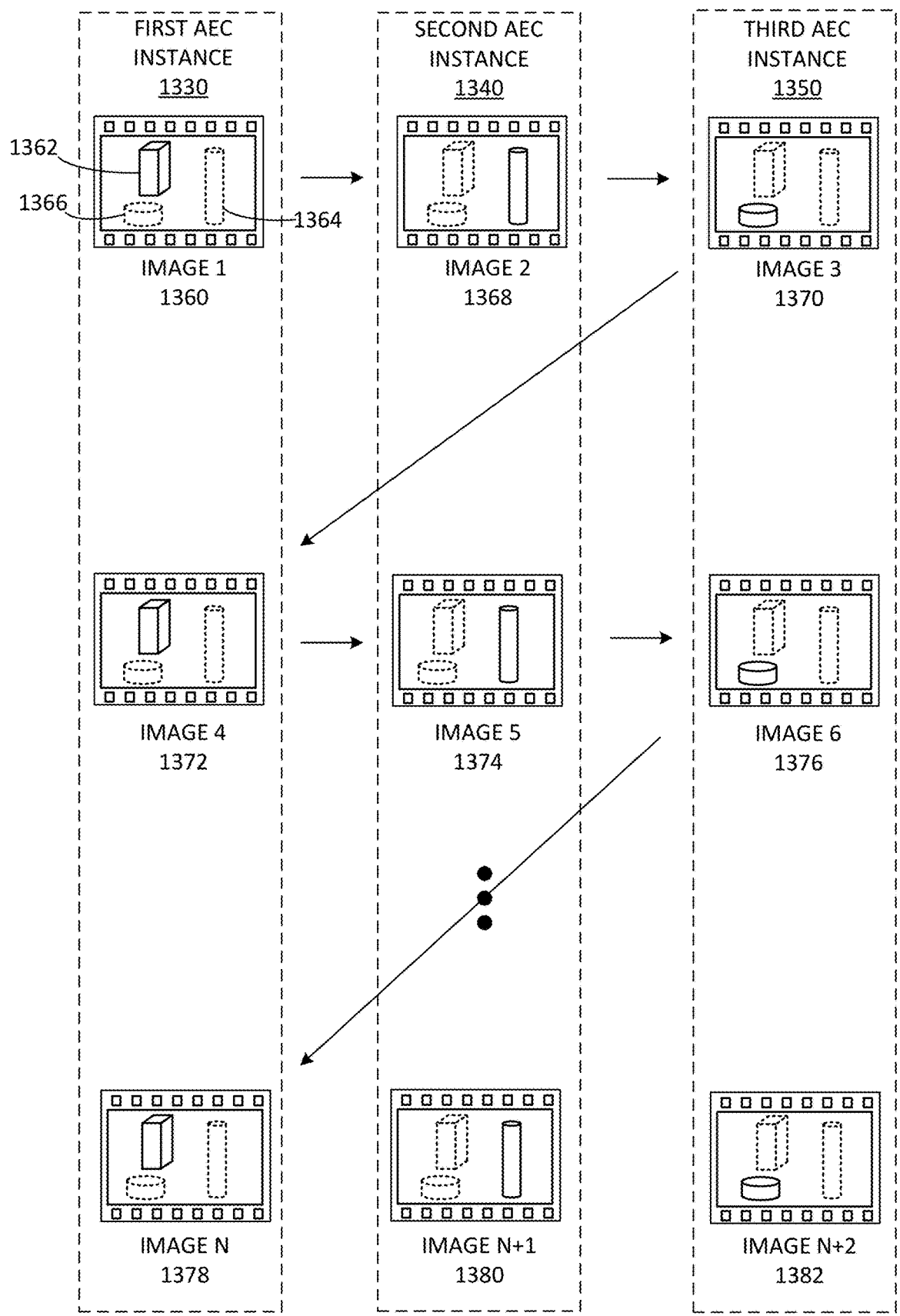
FIG. 13 illustrates an example of an image stream that may be used with the image stitching process.

FIG. 13 illustrates an example of an image stream that may be used with an image stitching process (e.g., the image stitching process 1200). The image stream illustrates a plurality of images that may be received by an image controller (e.g., the image controller 1220). In the example of FIG. 13, an object in an image with dotted lines indicates that an AEC instance does not concentrate on the object. On the other hand, an object in an image with solid lines indicates that an AEC instance is performed based upon the object.

The images in FIG. 13 are separated into which images are sent to which AEC instance. For example, image 1 (1332) is sent to a first AEC instance 1330. The image 1 (1332) is illustrated as having a first object 1362 with solid lines, which indicates that the first AEC instance 1330 is performed based upon the first object 1362. The image 1 (1332) also has a second object 1364 and a third object 1366. The second object 1364 and the third object 1366 are illustrated as having dotted lines, indicating that the first AEC instance 1330 treats both objects as not being identified.

The first AEC instance 1330 may determine an adjustment for one or more settings (e.g., an exposure setting, a gain setting, or any combination thereof) of a content capture device (e.g., the content capture device 1210). The adjustment may be sent to the content capture device 1210 such that the content capture device 1210 adjusts the one or more settings of the content capture device 1210. In some examples, the one or more settings may be sent to the content capture device 1210 right before the content capture device 1210 is to capture an image. In such examples, upon receipt of the one or more settings, the content capture device 1210 may adjust its settings. In other examples, the content capture device 1210 may be configured to receive the one or more settings and wait until it is time to capture an image with the one or more settings (such as based upon a loop as described above).

Image 2 (1368) may be sent to a second AEC instance 1340. The second AEC instance 1340 may be performed based upon an object corresponding to the second object 1364. Image 3 (1370) may be sent to a third AEC instance 1350. The third AEC instance 1350 may be performed based upon an object corresponding to the third object 1366. The second and the third AEC instances (1340, 1350) may also determine and send one or more settings to the content capture device 1210 (similar to as described above for the first AEC instance 1330).

Image 1 (1360), image 2 (1368), and image 3 (1370) may represent a loop. After one or more settings are set due to an AEC instance, an additional image may be captured with the one or more settings. After the additional image is captured, the image controller may determine which AEC instance that the one or more settings were set from. The image controller may then send the additional image to the determined AEC instance. For example, the first AEC instance 1330 may set one or more first settings based upon image 1 (1360). When the image controller receives image 4 (1372), which may be captured using the one or more first settings, the image controller may send the image 4 (1372) to the first AEC instance 1330. Similarly, image 5 (1374) may be sent to the second AEC instance 1340 and image 6 (1376) may be sent to the third AEC instance 1350.

The images 4, 5 and 6 (1372, 1374, 1376) may represent a second loop. This process may continue until image n, n+1, and n+2 (1378, 1380, 1382) are received. A similar process may occur, including determining which AEC instance is associated with the new images, and sending the new images to an AEC instance that generated one or more settings used to capture the new images. For example, the image n (1378) may be sent to the first AEC instance 1330, the image n+1 (1380) may be sent to the second AEC instance 1340, and the image n+2 (1382) may be sent to the third AEC instance 1350.

Figure 14:
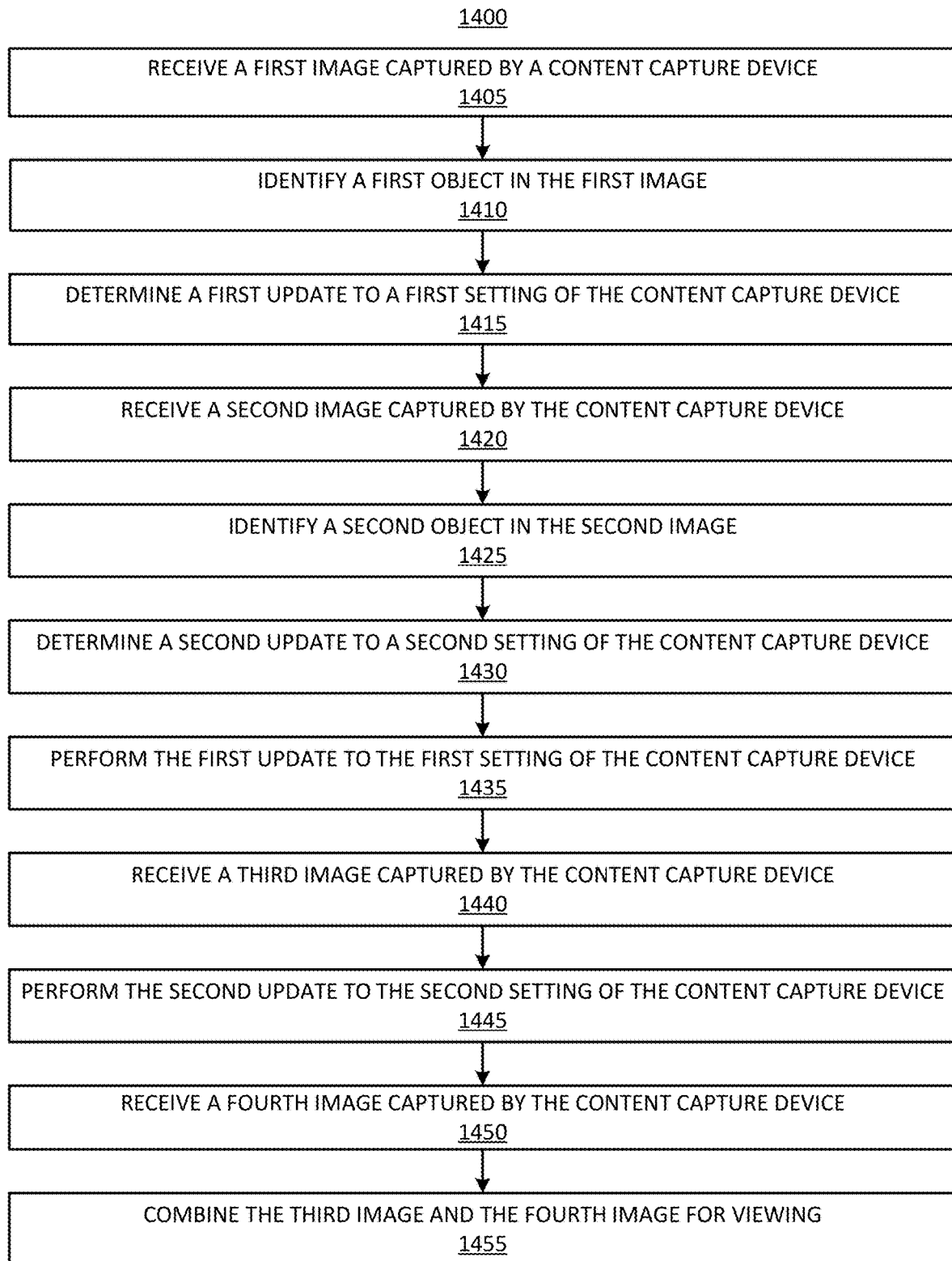
FIG. 14 is a flowchart illustrating an embodiment of a process for automatic exposure control using an image stitching process.

FIG. 14 is a flowchart illustrating an embodiment of a process 1400 for automatic exposure control using a third weighting model. In some aspects, the process 1400 may be performed by a computing device.

Process 1400 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

The process 1400 may include receiving a first image captured by a content capture device (1405). In some examples, the content capture device may be in a high dynamic range (HDR) mode. The HDR mode may cause a plurality of pictures to be taken close in time with varying settings (e.g., an exposure setting, a gain setting, or any combination thereof).

The process 1400 may further include identifying a first object in the first image (1410). In some examples, the first object may be identified using an object identification system. In such examples, the object identification system may identify a type of the first object (e.g., a person, an animal, a building, or the like). In other examples, the object identification system may identify one or more attributes or characteristics of the first object, more than just a type of the first object (e.g., that the first object is Bob Marley). In some examples, the object identification system may identify whether the first object is being processed by another system (such as a mixed reality system that is determining where to place a virtual object).

The process 1400 may further include determining a first update to a first setting of the content capture device (1415). In some examples, the first update may be determined for the first object. In such examples, the first update may be determined using any of the weighting models described herein, including the first weighting model and/or the second weighting model. In some examples, the first setting may be an exposure setting, a gain setting, or any combination thereof. In such examples, the exposure setting may be a shutter speed, an ISO speed, or any combination thereof. The gain setting may be digital gain, analog gain, or any combination thereof.

The process 1400 may further include receiving a second image captured by the content capture device (1420). In some examples, the second image may be captured before or after the first image. In some examples, the second image may be captured according to the HDR mode.

The process 1400 may further include identifying a second object in the second image (1425). In some examples, the second object may be identified using the object identification system described above.

The process 1400 may further include determining a second update to a second setting of the content capture device (1430). In some examples, the second update may be determined for the second object. In some examples, the second update may be determined using any of the weighting models described herein, including the first weighting model and/or the second weighting model. In such examples, the weighting model used for the second update may be the same or different than the weighting model used for the first update.

The process 1400 may further include performing the first update to the first setting of the content capture device (1435). Performing the first update may include sending one or more instructions to the content capture device that causes the content capture device to change the first setting. In some examples, the one or more instructions may be sent that causes the first setting to be updated at a point in the future (e.g., when an image is about to be taken that should be using the first setting). In other examples, the one or more instructions may be sent after an image is captured (or received) from the content capture device, the capture indicating that a new image is about to be captured that may use the first setting.

The process 1400 may further include receiving a third image captured by the content capture device (1440). In some examples, the third image may be captured after the first update is performed. In such examples, the first update may be applied to the content capture device such that the third image is captured with an exposure based upon the first update.

The process 1400 may further include performing the second update to the second setting of the content capture device (1345). Performing the second update may include sending one or more instructions to the content capture device that causes the content capture device to change the second setting. In some examples, the one or more instructions may be sent that causes the second setting to be updated at a point in the future (e.g., when an image is about to be taken that should be using the second setting). In other examples, the one or more instructions may be sent after an image is captured (or received) from the content capture device, the captured indicated that a new image is about to be captured that may use the second setting.

The process 1400 may further include receiving a fourth image captured by the content capture device (1450). In some examples, the fourth image may be captured after the second update is performed. In such examples, the second update may be applied to the content capture device such that the fourth image is captured with an exposure based upon the second update.

The process 1400 may further include combining the third image and the fourth image into a single image for viewing (1455). In some examples, combining (e.g., stitching) may include taking a portion of the third image and a portion of the fourth image. For example, the third image may correspond to the first image, which was optimized for the first object. In such an example, the portion of the third image that is taken may be associated with the first object such that combining include taking the portion of the third image that is associated with the first object. Similarly, the fourth image may correspond to the second image, which was optimized for the second object. Thus, the portion of the fourth image that is taken may be associated with the second object such that combining may include taking the portion of the fourth image that is associated with the second object. After taking the portions of the third and fourth image that are associated with the first and second object respectively, other portions of the third and fourth image may be averaged between the third image and the fourth image. The other portions may not be associated with either the first object or the second object such that the other portions were not optimized by the first update and/or the second update. However, it should be recognized that images may be stitched (or combined) in a variety of ways.

In some examples, the process 1400 may include a first cycle and a second cycle. The first cycle may include the first image and the second image. The second cycle may include the third image and the fourth image. In some examples, each new cycle may include two more images such that the operations continue to be performed on each new cycle. In some examples, each new cycle may be used to update setting of a content capture device (similarly to the first image and the second image) as well as be combined (similarly to the third image and the fourth image. For example, determining updates (as described for the first image and the second image) may be performed for the third image and the fourth image.

Figure 15:
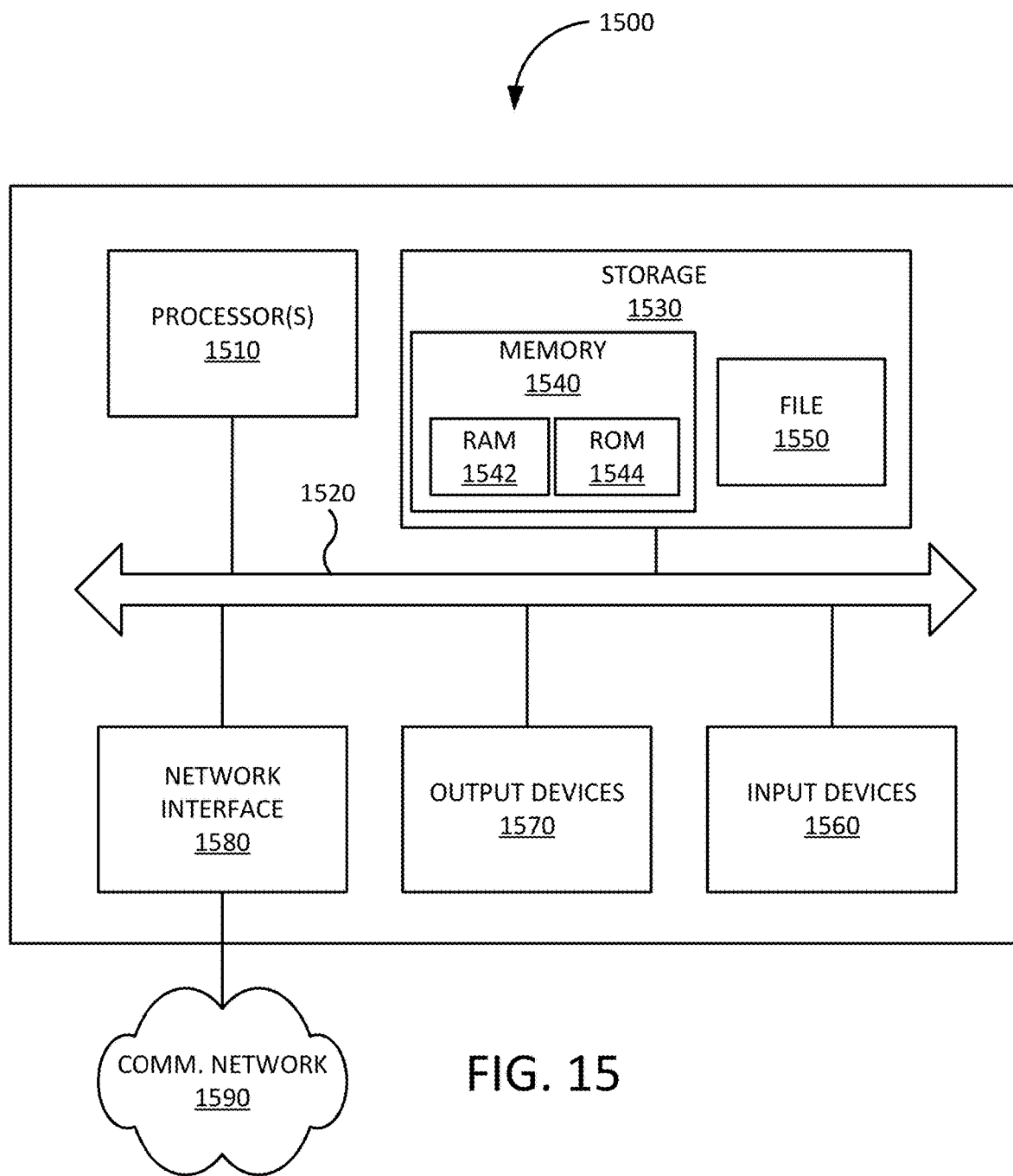
FIG. 15 illustrates an example of a block diagram for a computer system.

FIG. 15 illustrates an example of a block diagram for a computer system. In this example, the computer system 1500 includes a monitor 1510, computer 1520, a keyboard 1530, a user input device 1540, one or more computer interfaces 1550, and the like. In the present example, the user input device 1540 is typically embodied as a computer mouse, a trackball, a track pad, a joystick, wireless remote, drawing tablet, voice command system, eye tracking system, and the like. The user input device 1540 typically allows a user to select objects, icons, text and the like that appear on the monitor 1510 via a command such as a click of a button or the like.

Examples of the computer interfaces 1550 typically include an Ethernet card, a modem (telephone, satellite, cable, ISDN), (asynchronous) digital subscriber line (DSL) unit, FireWire interface, USB interface, and the like. For example, the computer interfaces 1550 may be coupled to a computer network 1555, to a FireWire bus, or the like. In other embodiments, the computer interfaces 1550 may be physically integrated on the motherboard of the computer 1520, may be a software program, such as soft DSL, or the like.

In various examples, the computer 1520 typically includes familiar computer components such as a processor 1560, and memory storage devices, such as a random access memory (RAM) 1570, disk drives 1580, and system bus 1590 interconnecting the above components.

The RAM 1570 and disk drive 1580 are examples of tangible media configured to store data such as embodiments of the present disclosure, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various examples, the computer system 1500 may also include software that enables communications over a network such as the HTTP, TCP/IP, RTP/RTSP protocols, and the like. In alternative embodiments of the present disclosure, other communications software and transfer protocols may also be used, for example IPX, UDP or the like.

The features described herein may be implemented in digital electronic circuitry, or in computer hardware, firmware, software, or in combinations of them. The apparatus may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube), LCD (liquid crystal display), LED (light emitting diode) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the disclosure have been described. Nevertheless, it will be understood that various modification may be made without departing from the scope of the disclosure.

What is claimed is:

1. A method for computing a total weight array, the method comprising:
   receiving an image frame captured by a content capture device;
   identifying a plurality of objects in the image frame, wherein each object of the plurality of objects is represented by one of a plurality of pixel groups corresponding to a shape of each object of the plurality of objects;
   providing a plurality of neural networks;
   calculating, for each object of the plurality of objects, an object weight using a corresponding neural network of the plurality of neural networks; and
   computing the total weight array by summing the object weight for each of the plurality of objects.

2. The method of claim 1 wherein each of the plurality of neural networks comprises a different neural network.

3. The method of claim 1 wherein each object of the plurality of objects is associated with a row r and a column c of the image frame.

4. The method of claim 3 wherein the total weight array is $$w_T[r, c] = \sum_{i=0}^{N_o} w_i[r, c],$$

where $N_o$ is the number of objects and $w_i[r, c]$ is the object weight for each of the plurality of objects.

5. The method of claim 1 wherein each object weight comprises a single value.

6. The method of claim 5 wherein the single value is applied to all pixels in each of the pixel groups of the plurality of pixel groups.

7. The method of claim 1 further comprising:
identifying a target luma value for the image frame;
calculating an image luma value using the total weight array; and
computing a difference between the image luma value and the target luma value; and
updating a setting of the content capture device based upon the computed difference.

8. The method of claim 1 further comprising:
receiving, by each neural network of the plurality of neural networks, a plurality of inputs corresponding to the object associated with the corresponding neural network; and
outputting, by each neural network of the plurality of neural networks, a single weight for the object associated with the corresponding neural network.

9. The method of claim 1 further comprising receiving, by each neural network of the plurality of neural networks, a plurality of attributes as inputs to each neural network of the plurality of neural networks.

10. A method comprising:
receiving an image captured by a content capture device;
identifying a target luma value for the image;
providing a plurality of neural networks;
identifying a plurality of objects in the image, wherein each of the plurality of objects is represented by a pixel group corresponding to a shape of each object of the plurality of objects;
calculating, for each object of the plurality of objects, an object weight using a corresponding neural network of the plurality of neural networks;
defining a first set of pixel groups associated with the plurality of objects;
defining a second set of pixel groups not associated with the plurality of objects;
calculating a pixel group luma value for each pixel group of the first set of pixel groups;
multiplying the pixel group luma value by the object weight to provide a weighted pixel group luma value for each pixel group of the first set of pixel groups; and
calculating a total luma value for the image.

11. The method of claim 10 further comprising:
computing a difference between the total luma value and the target luma value; and
updating a setting of the content capture device based upon the computed difference.

12. The method of claim 10 wherein the image comprises one image of a stream of images.

13. The method of claim 10 wherein the image comprises pixels, each having a pixel luma value, and the target luma value corresponds to an average of the pixel luma values.

14. The method of claim 10 wherein the image comprises pixels, each having a pixel luma value and a weight, and the target luma value corresponds to a weighted average of the pixel luma values.

15. The method of claim 10 further comprising identifying one or more attributes for each of the plurality of objects in the image.

16. The method of claim 15 wherein the one or more attributes include at least one of a priority weight array for object priority, a size weight array for object size, a distance weight array for object distance, or a gaze weight array for eye gaze.

17. The method of claim 15 wherein each corresponding neural network uses the one or more attributes as input.

18. The method of claim 10 wherein the pixel group luma value comprises an average of luma values for each pixel of the pixel group.

19. The method of claim 10 wherein the total luma value equals a summation of the weighted pixel group luma value for each pixel group of the first set of pixel groups times the pixel group luma value for each pixel group of the first set of pixel groups.

20. The method of claim 10 wherein each of the plurality of neural networks comprises a different neural network.

* * * * *